(12) United States Patent
Badhwar et al.

(10) Patent No.: US 11,710,232 B2
(45) Date of Patent: Jul. 25, 2023

(54) IMAGE PROCESSING BASED ADVISORY SYSTEM AND A METHOD THEREOF

(71) Applicant: RELIANCE INDUSTRIES LIMITED, Mumbai (IN)

(72) Inventors: Rahul Badhwar, Jalandhar (IN); Arun Banerjee, Maharashtra (IN); Raghuram Lanka, Hyderabad (IN); Kenny Paul, Palakkad (IN); Rajesh Nandru, Hyderabad (IN); Suraj Chavan, Jalna (IN); Sushant Kangade, Mumbai (IN); Bhaskar Bhadra, Hyderabad (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 204 days.

(21) Appl. No.: 17/328,734

(22) Filed: May 24, 2021

(65) Prior Publication Data
US 2021/0365683 A1 Nov. 25, 2021

(30) Foreign Application Priority Data

May 23, 2020 (IN) .............................. 202021021742

(51) Int. Cl.
*G06T 7/00* (2017.01)
*H04N 7/18* (2006.01)
(Continued)

(52) U.S. Cl.
CPC ...... *G06T 7/0012* (2013.01); *G06F 18/23213* (2023.01); *G06T 7/11* (2017.01);
(Continued)

(58) Field of Classification Search
CPC .................... G01N 33/025; G01N 2021/8466
See application file for complete search history.

(56) References Cited

U.S. PATENT DOCUMENTS

| 2005/0072935 A1* | 4/2005 | Lussier | .............. G01N 21/6486 |
| | | | 250/458.1 |
| 2014/0279790 A1* | 9/2014 | Ramachandran | ........ G06N 7/01 |
| | | | 706/46 |

OTHER PUBLICATIONS

Haboudane D, Miller JR, Pattey E, Zarco-Tejada PJ, Strachan IB. Hyperspectral vegetation indices and novel algorithms for predicting green LAI of crop canopies: Modeling and validation in the context of precision agriculture. Remote sensing of environment. Apr. 15, 2004;90(3):337-52. (Year: 2004).*

(Continued)

*Primary Examiner* — Clifford Hilaire
(74) *Attorney, Agent, or Firm* — Ladas & Parry LLP

(57) ABSTRACT

The present disclosure relates to the field of image processing and discloses an agricultural advisory system (100) comprising a user device (102) and a cloud server (104). The user device (102) captures a digital image of a scene, receives a sensed data corresponding to scene-related and environmental parameters, and transmits the image and the sensed data to the cloud server. The server (104) stores one or more pre-trained prediction models and a three-dimensional HyperIntelliStack which maps red green blue (RGB) pixel values with hyperspectral reflectance values. The server (104) receives the digital images and the sensed data, transforms the received image made of RGB pixel values into a hyperspectral image using the HyperIntelliStack data structure, computes vegetation indices for each pixel of the hyperspectral image to generate a segmented image, and generates at least one advisory for agriculture and allied areas using the segmented image and one or more prediction models.

19 Claims, 18 Drawing Sheets

(51) Int. Cl.
*G06T 7/62* (2017.01)
*G06T 7/194* (2017.01)
*G06T 7/11* (2017.01)
*G06V 20/20* (2022.01)
*G06F 18/23213* (2023.01)
*G06V 10/25* (2022.01)
*G06V 10/762* (2022.01)
*G06V 20/10* (2022.01)

(52) U.S. Cl.
CPC ............... *G06T 7/194* (2017.01); *G06T 7/62* (2017.01); *G06V 10/25* (2022.01); *G06V 10/763* (2022.01); *G06V 20/188* (2022.01); *G06V 20/20* (2022.01); *H04N 7/183* (2013.01); *G06T 2207/10024* (2013.01); *G06T 2207/10028* (2013.01); *G06T 2207/20081* (2013.01); *G06T 2207/30188* (2013.01)

(56) References Cited

OTHER PUBLICATIONS

Liu H, Whiting ML, Ustin SL, Zarco-Tejada PJ, Huffman T, Zhang X. Maximizing the relationship of yield to site-specific management zones with object-oriented segmentation of hyperspectral images. Precision agriculture. Apr. 2018;19:348-64. (Year: 2018).*

Boaz Arad, etal.: Sparse Recovery of Hyperspectral Signal from Natural RGB Images: Springer International Publishing AG 2016 B. Leibe et al. (Eds.): ECCV 2016, Part VII, LNCS 9911, pp. 19-34, 2016.

Yan Jia, et al.: From RGB to Spectrum for Natural Scenes via Manifold-based Mapping: 2017: pp. 4705-4712.

Zhan Shi, et al.: HSCNN+: Advanced CNN-Based Hyperspectral Recovery from RGB Images: 2018: pp. 1052-1060.

\* cited by examiner

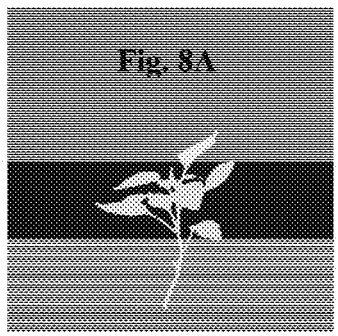
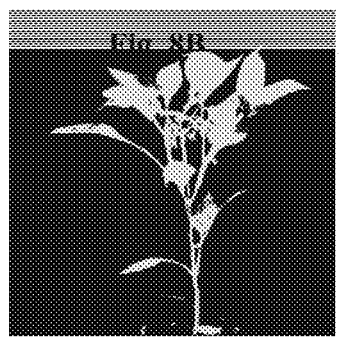
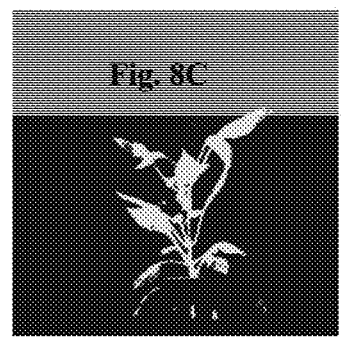
Fig. 8A  Fig. 8B  Fig. 8C
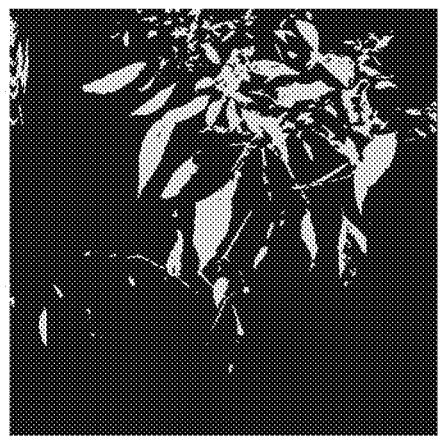
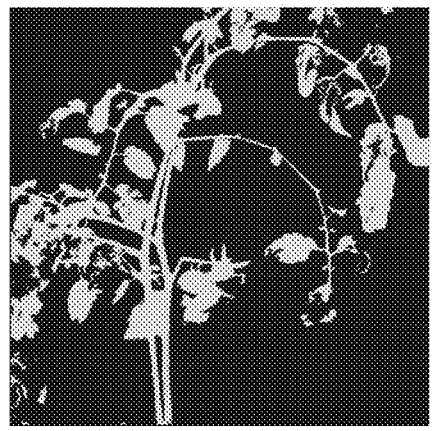
Fig. 8D  Fig. 8E Downey Mildew disease of Grape Anthracnose disease of Pomegranate Fruit border disease of Tomato detection Prediction of extent of disease progression in Grapes Downey mildew disease

IMAGE PROCESSING BASED ADVISORY SYSTEM AND A METHOD THEREOF

FIELD

The present disclosure relates to the field of image processing. More particularly, the present disclosure relates to an image processing based advisory system for precision agriculture and other allied fields and a method thereof.

Definitions

As used in the present disclosure, the following terms are generally intended to have the meaning as set forth below, except to the extent that the context in which they are used indicate otherwise.

Red Green Blue (RGB) Reflectance—The term "RGB reflectance" hereinafter refers to an amount of light reflected back from a surface entering into the sensor for red green and blue wavelengths. It is represented as a number.

RGB Value—The term "RGB value" hereinafter refers to a reflectance value transformed into an eight-bit integer ranging from 0-255 to represent a colour for each pixel (RGB or CMYK pixel).

Vegetation indices—The term "Vegetation indices" hereinafter refers to a method of spectral transformation of two or more spectral bands (spectrum) to understand and interpret spatial and temporal comparison of crop performance.

BACKGROUND

The background information herein below relates to the present disclosure but is not necessarily prior art.

Improvement of agricultural productivity has always been a great challenge for the agricultural sector. Both in "developed" and "developing" countries including nations having poor economy, farmers faces multitude of problems starting from unpredictable weather, unpredictable pest and disease infestation, unscientific and excess use of fertilizers, unscientific and excess use of toxic chemicals including pesticides. These factors not only significantly reduce crop yield, but also poses severe environmental challenges including deterioration of soil health, damaging farmer's health, reducing friendly pollinating insect population worldwide and increasing the input cost for farmers. To address this challenge, many breeding and genetic modification strategies have been employed with some success, however, these strategies take a very long duration for commercial release and faces many regulatory challenges along with environmental safety concerns including maintaining biodiversity. Therefore, this multifaceted problem demands a non-genetic approach along with environment friendly method and easily implementable technology.

There is a tremendous demand for precision and decision-based digital technologies for enabling judicious use of fertilizers, water management, disease management, weather-based sowing, decision-based harvesting, crop health prediction and overall yield prediction in real-time, so that farmers can intervene and apply simple methods for crop yield and farm productivity improvement.

Currently, satellite and remote sensing-based crop advisory solutions are there but they lack both spatial and temporal resolution, not real time, are costly and require highly skilled personnel and interventions. So, there is a demand for a simple but input-rich decision and precision advisory that can be easily adopted by farmers to obtain real-time farm solutions.

Furthermore, smartphone-based advisories and applications have been employed but they lack precision and provide information with a low degree of richness. The pace of prediction using these applications, especially for disease occurrence, is also low. Further, these applications do not facilitate early prediction of diseases, especially, when the diseases do not show an external visible phenotype. In such cases, crop loss due to failure in early prediction is enormous and can also lead to the extensive application of pesticides and fungicides, which is not required. It significantly increases crop production costs for farmers.

Most of the disease prediction applications are decision-based support systems, where the image of a disease showing externally visible phenotype is captured through a mobile camera or an application in mobile phone and then these images are collected to a database, where plant pathologists or experts manually identify the diseases for specific crops and then advisory is sent to the farmers on field. This is a time-consuming and huge resource intensive process. If a highly spreadable disease destroys a crop overnight, no immediate solution can be provided using this process.

The other major problem is that most of the devices or applications work only with a specific sensor devices based input, which needs to be solved. The devices or applications must be sensor independent. Another major problem for image capturing through smart mobile phones is that the resolution and other mathematical information associated with the image of interest depends on the brand or version of the phone used. This may result in a poor prediction or output accuracy for images taken from different cameras or different sensor-based cameras. Additional problems with the conventional devices or applications are caused due to background image, poor resolution of the image, or poor illumination condition of the captured images that are used as an input for analysis. A poor resolution, inaccurate spatial information or poor illumination can result in poor crop advisory or low prediction accuracy, which can, in turn, harm crop health, crop yield, and money invested by the farmers.

In addition to the above, ease of handling by farmers is another major concern, where in the current applications, the images have to be captured at a certain angle or in adequate light conditions. Further, the language in which advisory is generated by the conventional applications is typically other than the mother tongue of farmers. There are also many problems associated with faster image data collection and providing remedial measure recommendations at low cost and with high prediction accuracy. In developed countries like USA, Europe and developing countries like India, using Drone with costly cameras, expensive farm machineries with sensors including skilled labor to operate such devices and systems along with operating, maintenance cost adds up to the input cost of crop production and puts enormous burden on farmers.

Such expensive solutions additionally puts burden on fertilizer companies, pesticide companies and retail companies, making such solutions as commercially impractical.

Hyper-Spectral (HS) imagery has been proved to be a great source of information compared to conventional red green blue (RGB) images. The utility of HS imagery is in varied fields viz. agriculture, medical, geology, astronomy, security etc. The richness of HS information is associated with the high price of the sensor including optical systems, heat sink components for capturing complete spectral signature. The main obstacles of HS devices and allied systems are its physical size and volume, requirement of skilled manpower to operate and very high costs. These factors are major hindrance to use HS devices for commercial implementation and impossible for real world applications for farmers, fertilizer companies, chemical companies, medical, geology, astronomy, security fields. Therefore, in order to reduce cost, currently many studies are being conducted to transform the RGB images to hyperspectral images computationally.

For example, Arad and Ben-Shahar from Ben-Gurion University of the Negev, Beersheba, Israel, in their paper titled "*Sparse Recovery of Hyperspectral Signal from Natural RGB Images*", published in October 2016, Conference: European Conference on Computer Vision, demonstrated the formation of a HS dictionary from a prior acquired building data which can later be utilized for development of hyperspectral signature given information of a RGB pixel value. This method is simple but is computationally expensive and enables only a partial recovery of hyperspectral signatures. Further, this transformation technique has only been implemented for civil structures in the architectural discipline. Moreover, the technique is complex and computationally expensive because searching across a dictionary of combinations, as disclosed in this paper, may require solving many Non-deterministic polynomial complete (NP-complete) problems, which is not desired.

Similarly, in most of the conventional works, a model for detection of diseases is built on data captured with artificial indoor illumination. This is a huge limitation as in an outdoor environment, the illumination is variable and therefore, practically these methods cannot be used for outdoor application. Moreover, the conventional processes require a bulky and sophisticated computation facility for real-time advisory. Furthermore, the conventional methods are very limited in nature, i.e. designed for specific use cases or applications and cannot be used in applications including the scenario where a mix of crops or vegetables are present or grown within the same plot. The conventional models, methods fail to deliver results and generate false positives or false negatives as these method cannot perform 'crop classification'. If the conventional process is to be made global, one may need to install multiple applications within the same smart phone for providing advisories for different crops and different varieties.

In addition to this, most of the conventional methods can be applied only for 'supervised learning' which requires a labelled dataset, thereby putting a limitation on the cases where the data is not labelled. Further, they can only detect specific quality index and do not facilitate early disease predictions, prediction of progression of diseases, same crop different variety detection and the like. These detections and predictions are required for agricultural as well as industrial applications for early reduction of inputs such as toxic chemicals, excess chemical fertilizers which negatively affect crop health, crop quality, and crop yield. At the same time, due to the lack of 'prediction' inputs, the farming cost significantly increases.

Further, most of the conventional techniques do not facilitate the complete recovery of HS data from 400 to 2500 nm.

Therefore, there is felt a need for a real-time agricultural advisory system and method that alleviate the aforementioned drawbacks. Particularly, there is felt a need for a system that facilitates early predictions and identification of diseases in crops and suggests immediate remedial measures that can be taken to prevent crop loss, merely from an image of a crop and especially when the crop does not show any external visible symptoms.

Objects

Some of the objects of the present disclosure, which at least one embodiment herein satisfies, are as follows:

An object of the present disclosure is to provide an image processing based advisory system for precision agriculture and for quality evaluation and sorting of agricultural products and a method thereof.

Another object of the present disclosure is to provide an advisory system that is computationally inexpensive.

Still another object of the present disclosure is to provide an advisory system that does not require a bulky and sophisticated computation facility or infrastructure and bulky or sophisticated hardware and is therefore scalable and low cost.

Yet another object of the present disclosure is to provide a system that facilitates early prediction of crop diseases, determines the progression of diseases in crops, determines crop health, early prediction for nutrient deficiency and generates meaningful advisories for farmers.

Still another object of the present disclosure is to provide an agricultural advisory system that is easy to use and does not require any special skills.

Yet another object of the present disclosure is to provide an advisory system that can be seamlessly enhanced to the drone-based integrated digital RGB camera system as well as RGB depth camera based robotic crop harvesting systems to provide informative output for precision and decision services in agriculture and other allied fields.

Still another object of the present disclosure is to provide an agricultural advisory system that facilitates illumination independent processing of images, and can therefore be used in indoor, outdoor, industrial or any other environmental conditions.

Yet another object of the present disclosure is to provide an agricultural advisory system and method that can perform accurate crop and crop variety classification and can therefore be used in mixed cropping scenarios or mixed farming systems.

Still another object of the present disclosure is to provide an agricultural advisory system that can upscale and transform "pixel by pixel data" of input images with high pixel recall efficiency from red green blue (RGB) form to hyperspectral form.

Yet another object of the present disclosure is to provide an agricultural advisory system and method that can detect and predict health and diseases for every segment of a plant viz. leaf, fruit, and flower.

Still another object of the present disclosure is to provide an agricultural advisory system that generates actionable intelligence for farmers and that is global in nature.

Yet another object of the present disclosure is to provide an agricultural advisory system and method that facilitate complete recovery of hyperspectral data in the range of 400 to 2500 nm from RGB images.

Still another object of the present disclosure is to provide an agricultural advisory system that implements a sensor-independent process for providing hyperspectral level information from RGB images.

Yet another object of the present disclosure is to provide an agricultural advisory system that determines seed quality and assists farmers in taking harvesting decisions.

Other objects and advantages of the present disclosure will be more apparent from the following description, which is not intended to limit the scope of the present disclosure.

SUMMARY

The present disclosure envisages an image processing based advisory system for precision agriculture and for quality evaluation and sorting of agricultural products. The device comprises a user device and a cloud server. The user device comprises at least one red green blue (RGB) imaging unit, a processing unit, a first communication module, and a battery. The red green blue (RGB) imaging unit facilitates capturing of at least one digital image of a scene. The scene comprises views of one or more vegetables, fruits, plants, crops, any other vegetation, or a combination thereof from an agricultural field, an outdoor agricultural cultivation system, an indoor agricultural cultivation system, or a retail outlet.

The imaging unit is integrated with a first set of sensors to ensure capturing of a clear, stable, and low-noise digital image under different light conditions. The processing unit is configured to cooperate with the imaging unit to receive the digital image, and is further configured to cooperate with a second set of sensors to receive a sensed data corresponding to a pre-determined set of scene-related and environmental parameters. The first communication module is configured to cooperate with the processing unit to receive and transmit the digital image and the sensed data. The battery supplies power to at least the imaging unit, the processing unit, and the first communication module.

The cloud server comprises a second communication module, a database, a correlation module, a transforming unit, a computation module, and a prediction engine. The second communication module is configured to receive the digital images and the sensed data from the user device via a wireless communication network. The database is configured to store chemical signature and spectral signature based machine and deep learning library datasets comprising a prior acquired data for different crops and diseases. The prior data is associated at least with abiotic stress symptoms, nutrient deficiency, toxicity symptoms, crop growth stages, growth-stage wise nutrient requirement, information on weeds, and pre-harvest and post-harvest crop quality. The correlation module is configured to cooperate with the database to receive the datasets to train one or more prediction models. The correlation module is further configured to construct a three-dimensional HyperIntelliStack data structure from the datasets. The HyperIntelliStack data structure provides correlations between at least a set of red green blue (RGB) pixel values and hyperspectral reflectance values corresponding to each of the RGB values, each face of the HyperIntelliStack data structure representing one primary RGB reflectance or value, each of the faces is divided into a plurality of cells, wherein each cell provides a pre-trained hyperspectral signature for a given set of RGB values. The transforming unit is configured to cooperate with the correlation module to transform the received digital image made of multiple RGB pixel values into a hyperspectral image using the HyperIntelliStack data structure. The computation module is configured to cooperate with the transforming unit to compute a plurality of vegetation indices for each pixel of the hyperspectral image, and is further configured to generate a segmented image from the received hyperspectral image based on the computed vegetation indices. The prediction engine is configured to cooperate with the computation module to receive the segmented image, and is further configured to cooperate with the correlation module to generate at least one meaningful advisory for precision agriculture and for quality evaluation and sorting of agricultural products using the segmented image and one or more prediction models. The device comprises a display unit configured to receive the meaningful advisory from the cloud server and display the received advisory to a user of the device.

In an embodiment, the meaningful advisory comprises at least one actionable intelligence corresponding to crop type differentiation, plant part segmentation, crop growth stages identification, crop biotic and abiotic stress detection, crop health prediction, crop diseases prediction, crop harvesting decision, crop quality determination, fruit ripening determination, weed detection in agriculture field, contamination detection in crop and soil, and precision nutrition recommendation.

In an embodiment, the first and second set of sensors are miniatured sensors. Alternatively, the first and second set of sensors are micro-electromechanical system (MEMS) sensors.

In an embodiment, the first set of sensors comprise at least one of an autofocus and light sensor, an inertial measurement unit (IMU) sensor, an autofocus sensor, a complementary metal oxide semi-conductor (CMOS) sensor, and a red green blue (RGB) depth-based sensor. The autofocus and light sensor facilitate capturing of the digital image through the imaging device under different light conditions. The inertial measurement unit (IMU) sensor with gyroscope and drive units facilitate capturing of a clear and stable digital image. The autofocus sensor and a complementary metal oxide semi-conductor (CMOS) sensor facilitate capturing of low noise, high speed digital image with high colour reproducibility, machine vision application capability, and sensitivity towards the near-infrared region. The red green blue (RGB) depth-based sensors allow plant height, flowering and fruiting assessment, and volumetric parameter assessment including digital biomass determination.

In an embodiment, the second set of sensors are selected from the group consisting of an ambient temperature sensor, an ambient relative humidity sensor, an electrical conductivity sensor, a pH sensor, a photosynthetically active radiation sensor, a nitrogen sensor, a phosphorous sensor, a vapour pressure deficit sensor, and a SAP flow sensor.

In an embodiment, the first and second communication modules are selected from the group consisting of narrow-band IoT (NB-IoT) modules, radio frequency transceiver modules, Wireless Fidelity (Wi-Fi) modules, long range wireless communication modules, and cellular IoT modules.

In an embodiment, the second set of sensors are embedded within the user device. In another embodiment, one or more of the second set of sensors are implemented as distributed slave nodes installed across the scene. The second set of sensors may be patch-based sensors mounted on any crop parts or at soil surface to provide physio-chemical plant input data though distributed wireless network to the user device.

In an embodiment, the hyperspectral signatures stored in the HyperIntelliStack data structure comprise at least 204 hyperspectral bands. The hyperspectral reflectance data includes data with a hyperspectral range from 400 to 2500 nm.

In an embodiment, the transforming unit comprises a translation module and a combining module. The translation module is configured to receive the digital image, and is further configured to read the received image pixel by pixel and extract a hyperspectral signature corresponding to each pixel using the pre-trained HyperIntelliStack data structure. The combining module is configured to cooperate with the translation module to receive the extracted signatures corresponding to each pixel in the digital image and combine each of the signatures to form the hyperspectral image.

In an embodiment, the correlation module, the transforming unit, the computation module, and the prediction engine are located in the user device to facilitate the offline transformation of digital images into hyperspectral images and offline generation of meaningful advisories.

In an embodiment, the computation module comprises an estimator, a clustering module, and a processor. The estimator is configured to compute the vegetation indices for each pixel by superimposing the received sensed data onto the hyperspectral image. The clustering module is configured to apply k-means clustering over the computed vegetation indices for filtering the image. The processor is configured to cooperate with the clustering module to convert the clustered super pixels into a binary image, and is further configured to generate the segmented image by removing a background portion and retaining only a plant portion in the image.

In an embodiment, the prediction engine is configured to generate a mask over plant parts which are found to be infected, and is further configured to compute a total infected area of the plant, wherein if the computed total area exceeds a predetermined limit, the prediction engine generates advisory suggesting immediate measures to stop the spread of disease in plants and cure the disease.

In an embodiment, the device comprises a high sensitivity global positioning system (GPS), a user interface and software development kit, and a memory. The high sensitivity global positioning system (GPS) is used for capturing the current location of the device with local latitude and longitude. The user interface and software development kit is used to call one or more APIs for accessing data from pre-defined databases, raw sensor data, and current and historical weather data. The memory is configured to store at least one of the accessed data, the generated advisory, the digital image, and the sensed data.

The present disclosure further envisages an advisory generating method for precision agriculture and for quality evaluation and sorting of agricultural products. The method comprises the following steps:

a. capturing, by at least one red green blue (RGB) imaging unit of a user device, at least one digital image of a scene, the imaging unit integrated with a first set of sensors to ensure capturing of a clear, stable, and low-noise digital image under different light conditions;

b. receiving, by a processing unit of the user device, the digital image from the imaging unit;

c. receiving, by the processing unit, a sensed data corresponding to a pre-determined set of scene-related and environmental parameters from a second set of sensors;

d. transmitting, by a first communication module of the user device, the digital image and the sensed data;

e. receiving, by a second communication module of a cloud server, the digital images and the sensed data from the user device via a wireless communication network;

f. storing, in a database of the cloud server, chemical signature and spectral signature based machine and deep learning library datasets comprising a prior acquired data for different crops and diseases, the data associated at least with abiotic stress symptoms, nutrient deficiency, toxicity symptoms, crop growth stages, growth stage wise nutrient requirement, information on weeds, and pre-harvest and post-harvest crop quality;

g. receiving, by a correlation module of the cloud server, the datasets from the database to train one or more prediction models;

h. constructing, by the correlation module, a three-dimensional HyperIntelliStack data structure from the datasets, the HyperIntelliStack data structure providing correlations between at least a set of red green blue (RGB) pixel values and hyperspectral reflectance values corresponding to each of the RGB values, each face of the HyperIntelliStack data structure representing one primary RGB reflectance, each the faces divided into a plurality of cells, wherein each cell provides a pre-trained hyperspectral signature for a given set of RGB values;

i. transforming, by a transforming unit of the cloud server, the received digital image made of multiple RGB pixel values into a hyperspectral image using the HyperIntelliStack data structure;

j. computing, by a computation module of the cloud server, a plurality of vegetation indices for each pixel of the hyperspectral image;

k. generating, by the computation module, a segmented image from the received hyperspectral image based on the computed vegetation indices;

l. receiving, by a prediction engine the segmented image from the computation module;

m. generating, by the prediction engine, at least one meaningful advisory for precision agriculture and for quality evaluation and sorting of agricultural products using the segmented image and one or more prediction models; and n. receiving, by the user device, the generated advisory from the cloud server; and o. displaying, by a display unit of the user device, the received generated advisory to a user.

BRIEF DESCRIPTION OF THE ACCOMPANYING DRAWING

An image processing based advisory system and a method thereof, of the present disclosure, will now be described with the help of the accompanying drawing, in which:

FIGS. 8A-8E illustrate segmented images of brinjal plant, capsicum plant, mango plant, tomato plant, and weeds respectively generated using the system of FIG. 1;

LIST OF REFERENCE NUMERALS

Figure 1:
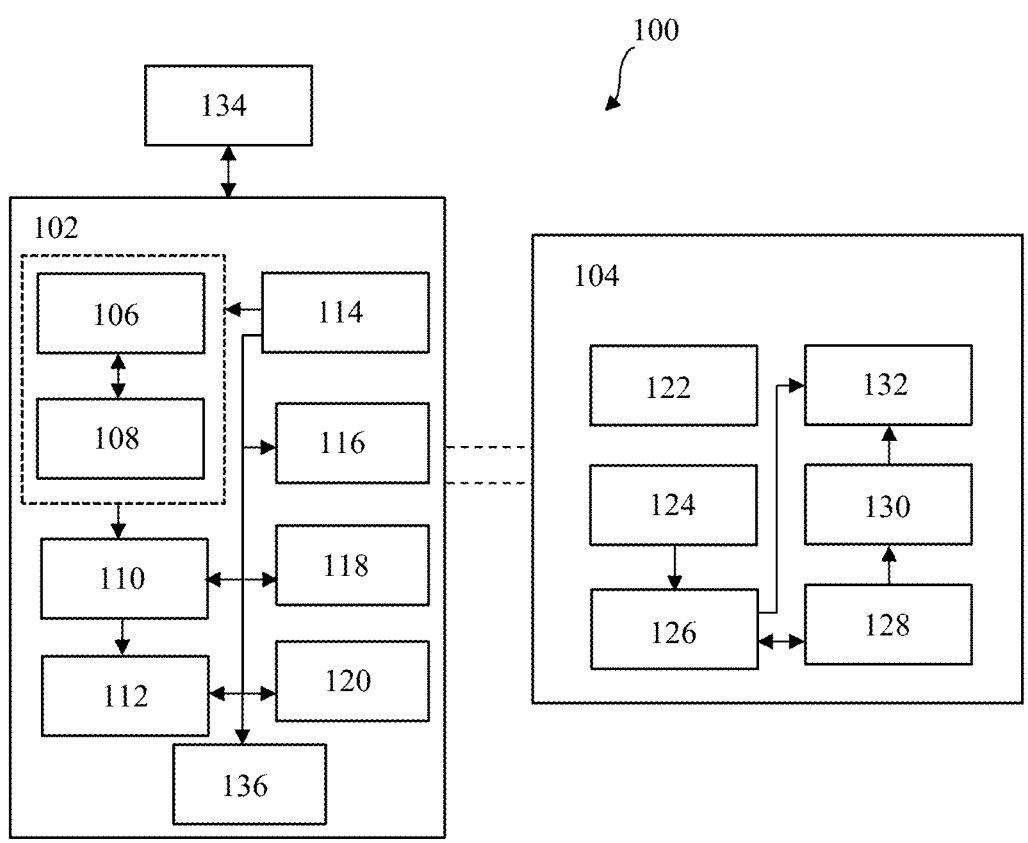
FIG. 1 illustrates a block diagram of an image processing based advisory system, in accordance with the present disclosure.

100—System
102—User device
104—Cloud server
106—Red green blue (RGB) imaging unit
108—First set of sensors
110—Processing unit
112—First communication module
114—Battery
116—Display unit
118—Global Positioning System
120—Memory
122—Second communication module
124—Database
126—Correlation module
128—Transforming unit
130—Computation module
132—Prediction engine
134—Second set of sensors

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open-ended transitional phrases and therefore specify the presence of stated features, elements, modules, units and/or components, but do not forbid the presence or addition of one or more other features, elements, components, and/or groups thereof.

When an element is referred to as being "mounted on", "engaged to", "connected to" or "coupled to" another element, it may be directly on, engaged, connected or coupled to the other element. As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Improvement of agricultural productivity has been always a great challenge and has an immense value. Many techniques have been proposed in the prior art to enhance agriculture productivity. Currently, most productivity improvement techniques implement image processing based techniques for plant disease detection, however, they have the following limitations— i. The techniques are computationally expensive, complex, and take higher computation time.

ii. The prediction models used conventionally perform scene detection or identification, but they fail to deliver when it comes to early disease prediction or progression of disease in crops/plants.

iii. These techniques have limited opportunity for real world applications for the farming community as they require bulky hardware, sensors, costly instruments and have less accuracy with no early prediction.

iv. Most of the conventional methods only allow partial recovery of hyperspectral information from Red Green Blue (RGB) images which limits their real-world application and also limits their application in health and disease prediction, crop classification, crop growth stages classification, nutrient mapping etc. With these techniques recovery of images is possible only within the visible spectrum range i.e., 400-700 nm.

v. The systems/devices described in the prior art for hyperspectral image analysis are difficult to implement for commercial applications in India where 80% of the farmers are poor. Also, with such a high cost involved it is impossible to apply this technology in solving real-time problems.

vi. Further, the prior art methods are mostly limited to a specific applications only, and cannot be used for/applied to other plants or crops. Moreover, they use supervised learning techniques for disease detection, which require a labelled dataset. Thus, these methods cannot work in cases where the dataset is not labelled.

vii. The prior art methods require images to be captured under uniform illumination and using indoor artificial lights, thus they cannot be extended to outdoor applications, further limiting their scalability and industrial application.

In order to alleviate the aforementioned shortcomings of the existing systems, an image processing based advisory system (hereinafter referred to as "system 100") and method for precision agriculture and for quality evaluation and sorting of agricultural products are now being described with reference to FIG. 1 through FIG. 15.

Referring to FIG. 1, the advisory system 100 comprises a user device 102 and a cloud server 104. The user device 102 comprises at least one red green blue (RGB) imaging unit 106, a processing unit 110, a first communication module 112, and a battery 114. The imaging unit 106 is used for capturing at least one digital image of a scene. The imaging unit 106 may comprise at least one camera integrated with an RGB sensor. The scene may comprise views of one or more vegetables, fruits, plants, crops, any other vegetation, or a combination thereof from an agricultural field, an outdoor agricultural outlet, an indoor agricultural outlet, or a retail outlet. The imaging unit 106 is integrated with a first set of sensors 108 to ensure capturing of a clear, stable, and low-noise digital image under different light conditions. The processing unit 110 is configured to cooperate with the imaging unit 106 to receive the digital image, and is further configured to cooperate with a second set of sensors 134 to receive a sensed data corresponding to a pre-determined set of scene-related and environmental parameters. The first communication module 112 is configured to cooperate with the processing unit 110 to receive and transmit the digital image and the sensed data. The battery 114 supplies power to the components of the device 102, including but not limited to, at least the imaging unit 106, the first set of sensors 108, the processing unit 110, and the first communication module 112. The cloud server 104 comprises a second communication module 122, a database 124, a correlation module 126, a transforming unit 128, a computation module 130, and a prediction engine 132. The second communication module 122 is configured to receive the digital images and the sensed data from the user device 102 via a wireless communication network. The database 124 is configured to store chemical signature and spectral signature based machine and deep learning library datasets comprising a prior acquired data for different crops and diseases. The data may include RGB reflectance values corresponding to various hyperspectral images of diseased or healthy crops, plants or vegetation. The data may be further associated at least with abiotic stress symptoms, nutrient deficiency, toxicity symptoms, crop growth stages, growth-stage wise nutrient requirement, information on weeds, and pre-harvest and post-harvest crop quality. The correlation module 126 is configured to cooperate with the database 124 to receive the datasets to train one or more prediction models. The correlation module 126 is further configured to construct a three-dimensional HyperIntelliStack data structure from the datasets, the HyperIntelliStack data structure providing correlations between at least a set of red green blue (RGB) pixel values and hyperspectral reflectance values corresponding to each of the RGB values. Each face of the HyperIntelliStack data structure represents one primary RGB reflectance. Each of the faces is divided into a plurality of cells, wherein each cell provides a pre-trained hyperspectral signature for a given set of RGB values. The transforming unit 128 is configured to cooperate with the correlation module 126 to transform the received digital image made of multiple RGB pixel values into a hyperspectral image using the HyperIntelliStack data structure. The computation module 130 is configured to cooperate with the transforming unit 128 to compute a plurality of vegetation indices for each pixel of the hyperspectral image, and is further configured to generate a segmented image from the received hyperspectral image based on the computed vegetation indices. The prediction engine 132 is configured to cooperate with the computation module 130 to receive the segmented image, and is further configured to cooperate with the correlation module 126 to generate at least one meaningful advisory for precision agriculture and for quality evaluation and sorting of agricultural products using the segmented image and one or more prediction models. The user device 102 comprises a display unit 116 configured to receive the meaningful advisory from the cloud server 104 and display the received advisory to a user of the device 102.

The meaningful advisory comprises at least one actionable intelligence related to crop type differentiation, plant part segmentation, crop growth stages identification, crop biotic and abiotic stress detection, crop health prediction, crop diseases prediction, crop harvesting decision, crop quality determination, fruit ripening determination, weed detection in agriculture field, contamination detection in crop and soil, and precision nutrition recommendation.

The user device 102 further comprises a high sensitivity global positioning system (GPS) 118 for capturing the current location of the device (102) with local latitude and longitude, a user interface integrated with software development kit 118 to call one or more Application Programming Interfaces (APIs) for accessing data from pre-defined databases, raw sensor data, and current and historical weather data, and a memory 120 configured to store at least one of the accessed data, the generated advisory, the digital image, and the sensed data. The APIs used herein are not open source APIs and are specifically developed for accessing the data from pre-defined databases, the raw sensor data, and the current and historical weather data.

The processing unit 110 of the user device 102 is coupled to the display unit 116 for displaying the digital image, and more particularly, for displaying the comprehensive crop actionable intelligence data output in real-time or non-real time with required remedial action items.

The processing unit 110 may be configured to facilitate the display of actionable intelligence in different languages as per the choice of user. The device 102 may be configured to receive the user choice(s) through the user interface which may be a high-sensitivity touch-based display system.

In an embodiment, the first and second set of sensors (108, 134) are miniatured sensors. Alternatively, the first and second set of sensors (108, 134) are micro-electromechanical system (MEMS) sensors.

The first set of sensors 108 comprise at least one of the following sensors:
- an autofocus and light sensor for facilitating capturing of the digital image through the imaging device 106 under different light conditions;
- an inertial measurement unit (IMU) sensor with gyroscope and drive units for facilitating capturing of a clear and stable digital image;
- an autofocus sensor and a complementary metal oxide semi-conductor (CMOS) sensor for capturing of low noise, high speed digital image with high colour reproducibility, machine vision application capability and sensitivity towards near-infrared region; and
- a red green blue (RGB) depth-based sensor for plant height, flowering and fruiting assessment, and volumetric parameter calculations including digital biomass determination.

The second set of sensors 134 are selected from the group consisting of, but not limited to, an ambient temperature sensor, an ambient relative humidity sensor, an electrical conductivity sensor, a pH sensor, a photosynthetically active radiation sensor, a nitrogen sensor, a phosphorous sensor, a vapour pressure deficit sensor, and a SAP flow sensor.

The first and second communication modules (112, 122), which facilitate wireless communication via a wireless communication network, are selected from the group consisting of, but not limited to, narrowband IoT (NB-IoT) modules, radio frequency transceiver modules, Wireless Fidelity (Wi-Fi) modules, long range wireless communication modules, and cellular IoT modules.

The user device 102 may thus include a plurality of sub-systems including, but not limited to cellular radio transmission/reception radio frequency (RF) connected to an antenna for receiving and transmitting wireless services including voice over internet protocol (VoIP) and internet or intranet services. The user device 102 may further comprise a subscriber identity module (SIM) configured for providing long term evolution (LTE) or voice over LTE (VoLTE) and other various functionalities in accordance with the present disclosure. The user device 102 can also comprise power sub-systems and external input/output (I/O) interface sub-systems.

In an embodiment, the second set of sensors 134 are embedded within the user device 102. In another embodiment, the second set of sensors 134 are implemented as distributed slave nodes and installed across the scene. These sensed data may be collected from the distributed network sensor nodes and relayed to the user device 102 through the wireless network to perform on-device data calibration and extract the output via the server connectivity established through an application programming interface.

Advantageously, the hyperspectral signatures stored in the HyperIntelliStack data structure comprise at least 204 hyperspectral bands. The hyperspectral reflectance data includes data with a hyperspectral range from 400 to 2500 nm.

Figure 15:
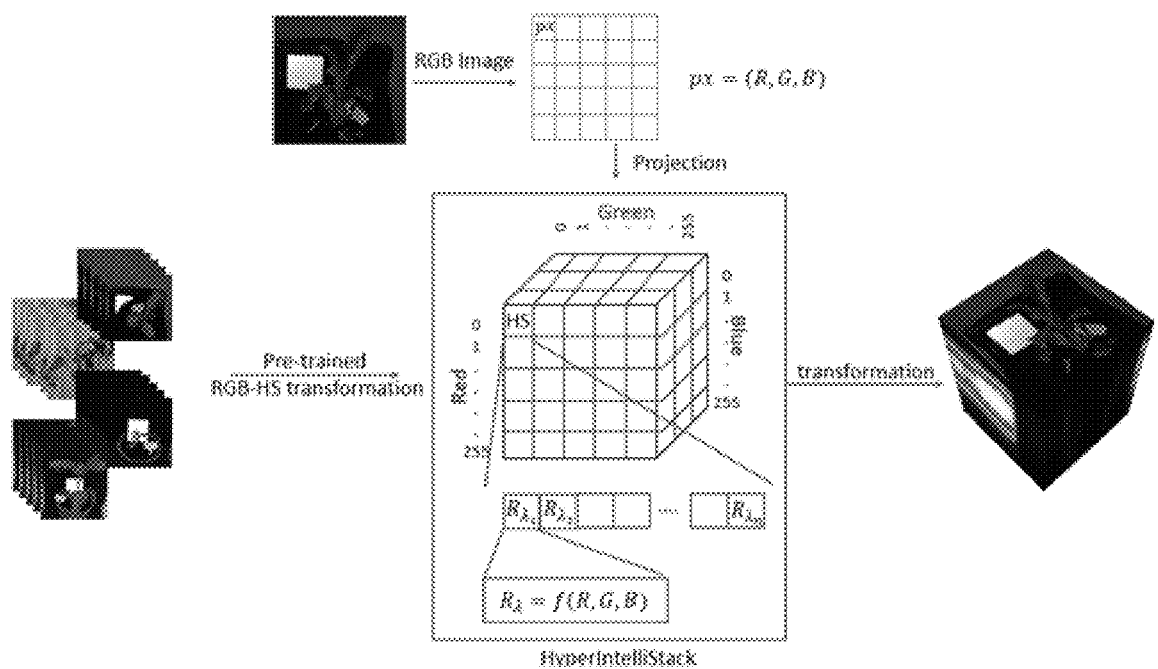
FIG. 15 illustrates a schematic diagram depicting the generation and use of a HyperIntelliStack data structure for transformation of an image from RGB form to hyperspectral form.

The HyperIntelliStack is a multidimensional object which is divided into a 3D-Matrix containing a 2D array, which in turn contains a statistical machine learned function to map RGB to its respective reflectance fingerprint of a particular wavelength. FIG. 15 illustrates a schematic diagram depicting the generation and use of a HyperIntelliStack data structure for transformation of an image from RGB form to hyperspectral form. The HyperIntelliStack structure reduces time complexity as all the functions are connected to each other and can be called individually or serially or parallelly. This further increases computational performance by utilising lesser computational power. "HyperIntelliStack" data structure helps to reduce the large size crop hyperspectral library imaging database including its spectrum fingerprint data for a huge number of crop types, crop disease types, crop growth stages, crop stress types, crop nutrient deficiency or toxicity types and various other related crop data in a "matrix within the matrix" format.

In an embodiment, the transforming unit 128 comprises a translation module and a combining module. The translation module is configured to receive the digital image, and is further configured to read the received image pixel by pixel and extract a hyperspectral signature corresponding to each pixel using the pre-trained HyperIntelliStack data structure. The combining module is configured to cooperate with the translation module to receive extracted signatures corresponding to each pixel in the digital image and combine each of the signatures to form the hyperspectral image.

Figure 3A:
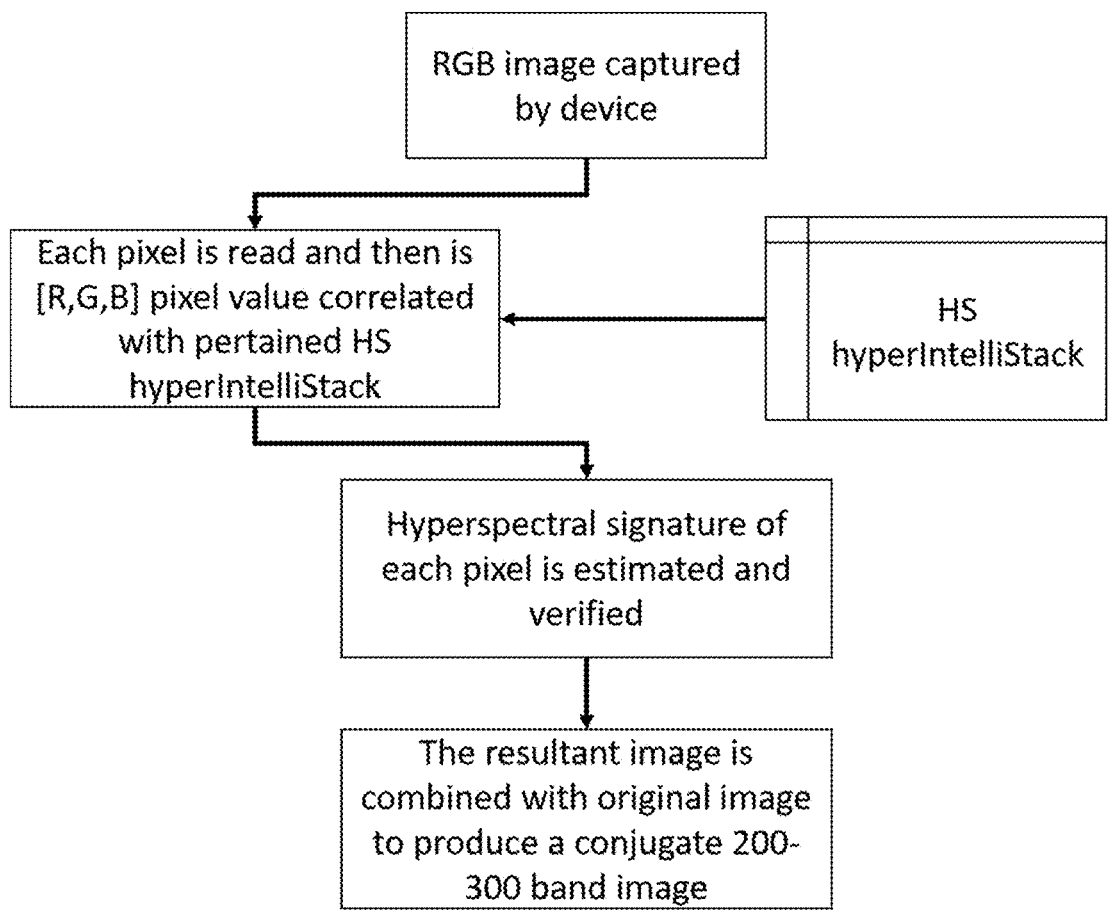
FIG. 3A illustrates a flow diagram depicting a process of red green blue to hyperspectral value (RGB-HS) transformation, in an offline mode, of an image taken by the system of FIG. 1.
Figure 3B:
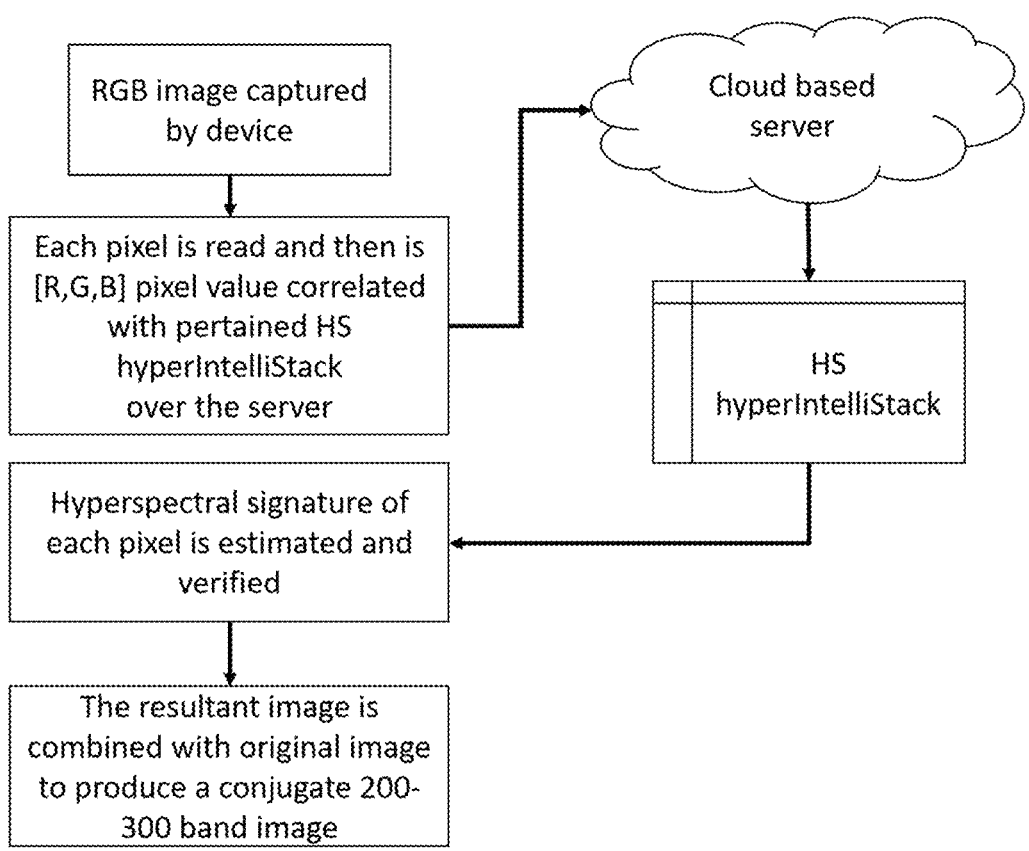
FIG. 3B illustrates a flow diagram depicting a process of red green blue to hyperspectral value (RGB-HS) transformation, in an online mode, of an image taken by the system of FIG. 1.

In the preferred embodiment, the process of transformation of digital images into hyperspectral images and generation of the meaningful advisories takes place in coordination with the server 104 (i.e. online) as shown in FIG. 3B. In an alternate embodiment, the correlation module 126, the transforming unit 128, the computation module 130, and the prediction engine 132 are installed in the user device 102 and may be implemented using one or more processors of the user device 102 to facilitate the offline transformation of digital images into hyperspectral images and offline generation of the meaningful advisories as shown in FIG. 3A.

Figure 4:
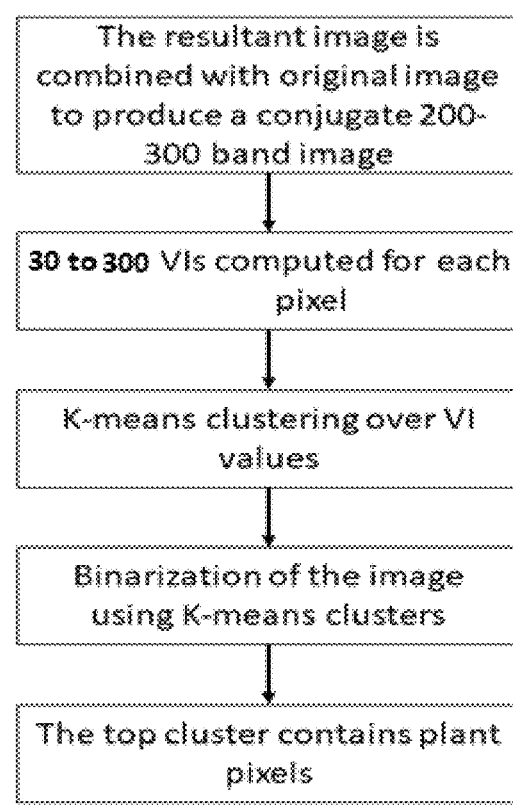
FIG. 4 illustrates a flow diagram depicting a process of segmentation of plant from hyperspectral images generated by the system of FIG. 1.

Referring to an embodiment of FIG. 4, the computation module 130 comprises an estimator, a clustering module, and a processor.

The estimator is configured to compute the vegetation indices for each pixel by superimposing the received sensed data onto the hyperspectral image.

The computed vegetation indices can be used for predicting various types of stress in the crop as well as in the soil. The system 100 computes these vegetation indices from the hyperspectral image. The computed vegetation indices, may include, but are not limited to, the following vegetation indices, (see Table 1 below).

TABLE 1

List of vegetation indices calculated for use in detection and prediction models. R# stands for reflectance at a wavelength (nm).

| Sr. No. | VI name | VI description |
|---|---|---|
| 1 | SR1 | simple ratio R800/R550 |
| 2 | SR2 | simple ratio R750/R550 |
| 3 | SR3 | simple ratio R800/R680 |
| 4 | SR4 | simple ratio R750/R700 |
| 5 | SR5 | simple ratio R800/R670 |
| 6 | SR6 | simple ratio R795/R670 |
| 7 | SR7 | simple ratio R740/R720 |
| 8 | GREENI | Green indices R570/R670 |
| 9 | DSWI4 | Disease-Water Stress Index R550/R680 |
| 10 | ARI | Anthocyanin reflectance index 1/R550 − 1/R700 |
| 11 | BI | Blue indices R450/R490 |
| 12 | PSSRb | Pigment specific simple ratio chlorophyll b R800/R635 |
| 13 | PSSRc | Pigment specific simple ratio carotenoids R800/R500 |
| 14 | CI1 | Carotenoid indices 1 = R515/R570 |
| 15 | CI2 | Carotenoid indices 2 = R520/R500 |
| 16 | WI | Water index R900/R970 |
| 17 | RE | Red Edge R750/R710 |
| 18 | Vog | Vogelmann index R740/R720 |
| 19 | RI | Redness index R700/R670 |
| 20 | NDVI | Normalized difference vegetation index (R800 − R670)/(R800 + R670) |
| 21 | ND1 | Normalized difference 1, (R800 − R680)/(R800 + R680); |
| 22 | ND2 | Normalized difference 2, (R750 − R660)/(R750 + R660) |
| 23 | ND3 | Normalized difference 3, (R750 − R705)/(R750 + R705) |
| 24 | ND4 | Normalized difference 4, (R755 − R705)/(R755 + R705) |

TABLE 1-continued

List of vegetation indices calculated for use in detection and prediction models. R# stands for reflectance at a wavelength (nm).

| Sr. No. | VI name | VI description |
|---|---|---|
| 25 | ND5 | Normalized difference 5, (R680 − R500)/R750 |
| 26 | mND | Modified Normalized difference, (R750 − R445)/(R705 + + R705 − R445) |
| 27 | mSR1 | Modified simple ratio 1, (R750 − R445)/(R705 + R445) |
| 28 | mSRI3 | Modified simple ratio 3, (R750 − R445)/(R750 + R445) |
| 29 | SIPI | Structure-intensive pigment index, (R800 − R445)/(R800 + R680) |
| 30 | PRI1 | Photochemical reflectance index 1, (R515 − R531)/(R515 + R531) |
| 31 | PRI2 | Photochemical reflectance index 2, (R534 − R565)/(R534 + R565) |
| 32 | PRI3 | Photochemical reflectance index 3, (R530 − R570)/(R530 + R570) |
| 33 | MCARI | Modified chlorophyll absorption in reflectance index, [(R700 − R670) − 0.2*(R700 − R550)]/(R700/R670) |
| 34 | TCARI | Transformed chlorophyll absorption in reflectance index, 3*[(R700 − R670) − 0.2*(R700 − 550)/(R700/R670)] |
| 35 | TVI | Triangular vegetative index, 0.5* 120*(R750 − R550) − 200* R670 − R550) |
| 36 | BGI1 | Blue green pigment indices 1, R400/R550 |
| 37 | BGI2 | Blue green pigment indices 2, R450/R550 |
| 38 | BRI1 | Blue red pigment indices 1, R400/R690 |
| 39 | BRI2 | Blue red pigment indices 2, R450/R690 |
| 40 | LIC | Lichtenthaler indices, R440/R740 |
| 41 | CTR1 | Carter Indices 1, R695/R420 |
| 42 | CTR2 | Carter Indices 2, R695/R760 |
| 43 | MTVI | Modified triangular vegetation index, 1.2*(1.2*(R800 − R550) − 2.5*(R670 − R550)) |

Upon computation of the vegetation indices, the clustering module is configured to apply k-means clustering over the computed vegetation indices for filtering the image. The processor is configured to cooperate with the clustering module to convert the clustered super pixels into a binary image, and is further configured to generate the segmented image by removing a background portion and retaining only a plant portion in the image.

Advantageously, the computation module 130 performs plant extraction i.e. separation of plant pixels from the background using HSPlantSeg technique. As an output, pixel segments containing plants or plant parts including leaves fruits etc. are obtained. Different VIs are used for the segmentation of different plant parts. This output (segmented image) can be used in Artificial Intelligence (AI) based models for classification and advisory generation.

The HSPlantSeg technique was tested on the images captured using a hyperspectral camera. This camera captures a 512*512 image within 400-1000 nm wavelength range with 204 spectral bands along with RGB (Red, Green, Blue visible channels) images. The raw images were read using spectral python library into the n-dimensional array of size 512*512*204. For each pixel, 43 different VI values were calculated by extracting near infrared and red band information from this n-dimensional array. K-means clustering was applied to cluster VI values which are responsible for plants and other objects in the image. The resultant clustered super pixels were converted to a binary image to segment only plant from the background.

Figure 6:
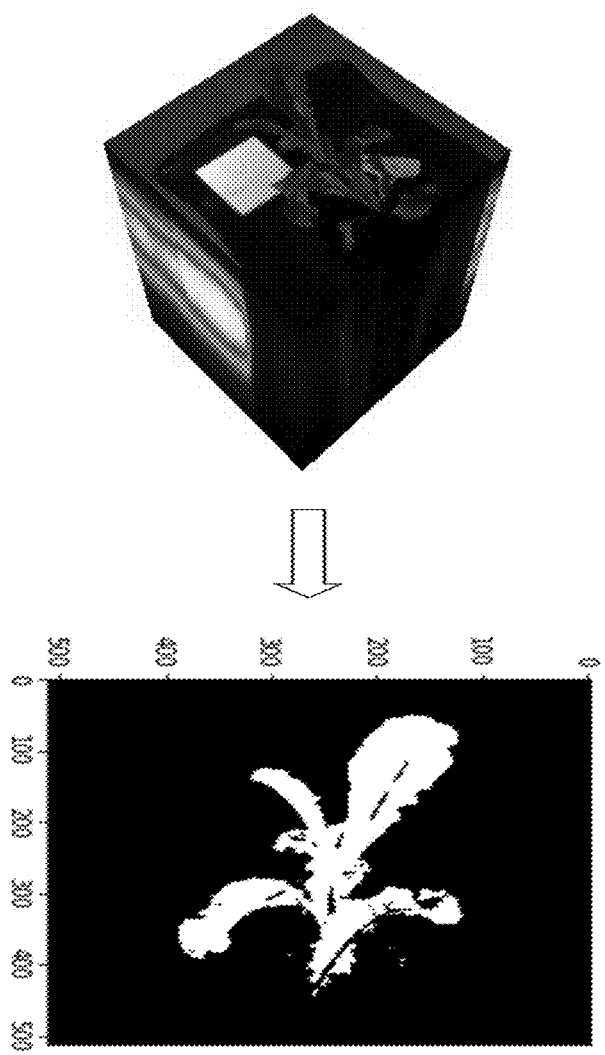
FIG. 6 illustrates a graphical representation of illumination invariant hyperspectral image segmentation.
Figure 9:
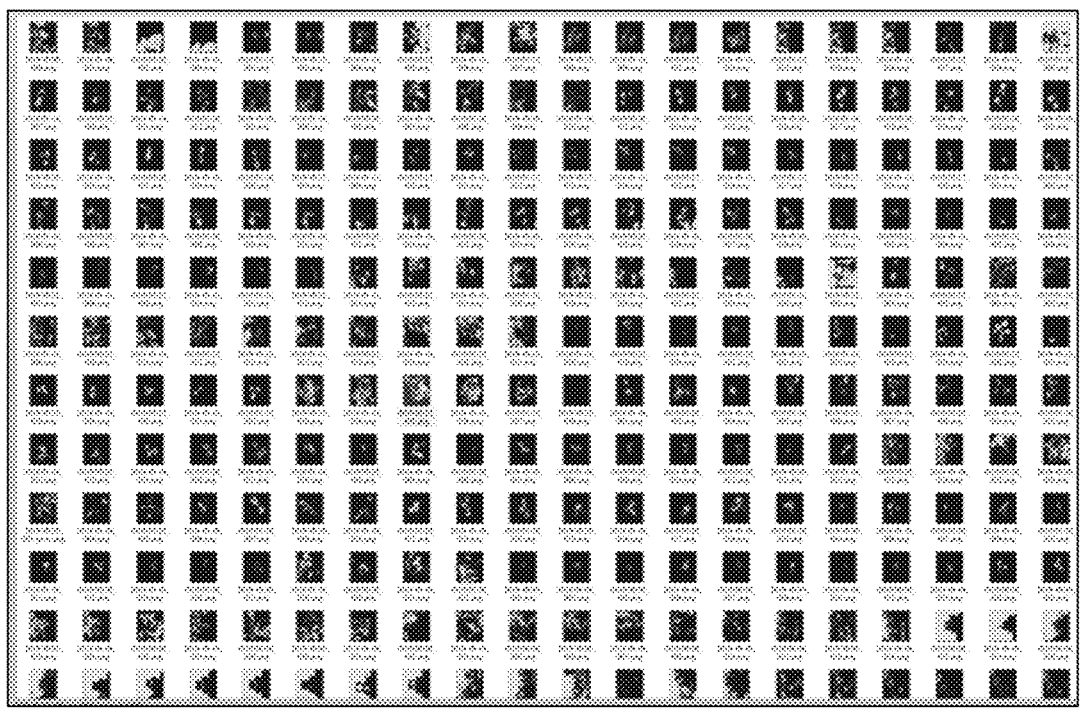
FIG. 9 illustrates working examples of segmented images of different crops or plants.

FIG. 6 illustrates an exemplary graphical representation of illumination invariant hyperspectral image segmentation. Similarly, FIGS. 8A-8E illustrate segmented images of brinjal plant, capsicum plant, mango plant, tomato plant, and weeds respectively generated using the system 100. FIG. 9 illustrates working examples of segmented images of different crops or plants.

This technique has the potential to be utilized as the base algorithm for extracting plants from images. The technique allows analysis, which is independent of light and the surrounding environment so that in different seasons, crop images can be easily processed for predicting crop health and yield. The technique can be used in various applications across platforms involving automation of hyperspectral image processing. The technique has been successfully applied on Asteraceae, Solanaceae, Anacardiaceae, Punicaceae, Vitaceae, Lythraceae, Poaceae, Leguminosae, Amaryllidaceae crop family and can be used for any other crop family grown in soil, soil-less medium, artificial growth medium, water or on a nutrient substratum. This technique assists in crop health determination, crop disease detection and prediction, crop quality determination, fruit ripening determination, crop harvesting decision making, weed detection in the agriculture field, contamination detection in crop and soil.

The first step in this imaging-based technique is to segment the image to correctly identify the region of interest (RoI). The system 100 may compute RoI in real-time using reflectance values of different wavelengths from 400 nm to 2500 nm. The system 100 yields a high precision and recall with a pixel capture efficiency of greater than 95%. The computed RoI aids in crop type differentiation using machines in an automated fashion, crop health and disease prediction and determination, weed and unwanted plant growth detection other than the crop of interest. This technique is a sensor as well as illumination invariant and independent and is used as one of the key modules in precision and smart decision-based agriculture management practices for crop quality improvement, crop yield improvement, reducing crop inputs in the form of fertilizer, herbicide, pesticides application, and thereby reducing the input cost of agriculture for farmers. This is an environment friendly, climate friendly technology along with a noninvasive process of digital machine learning based agriculture intervention for improving soil fertility and improving the livelihood of farmers.

Figure 7A:
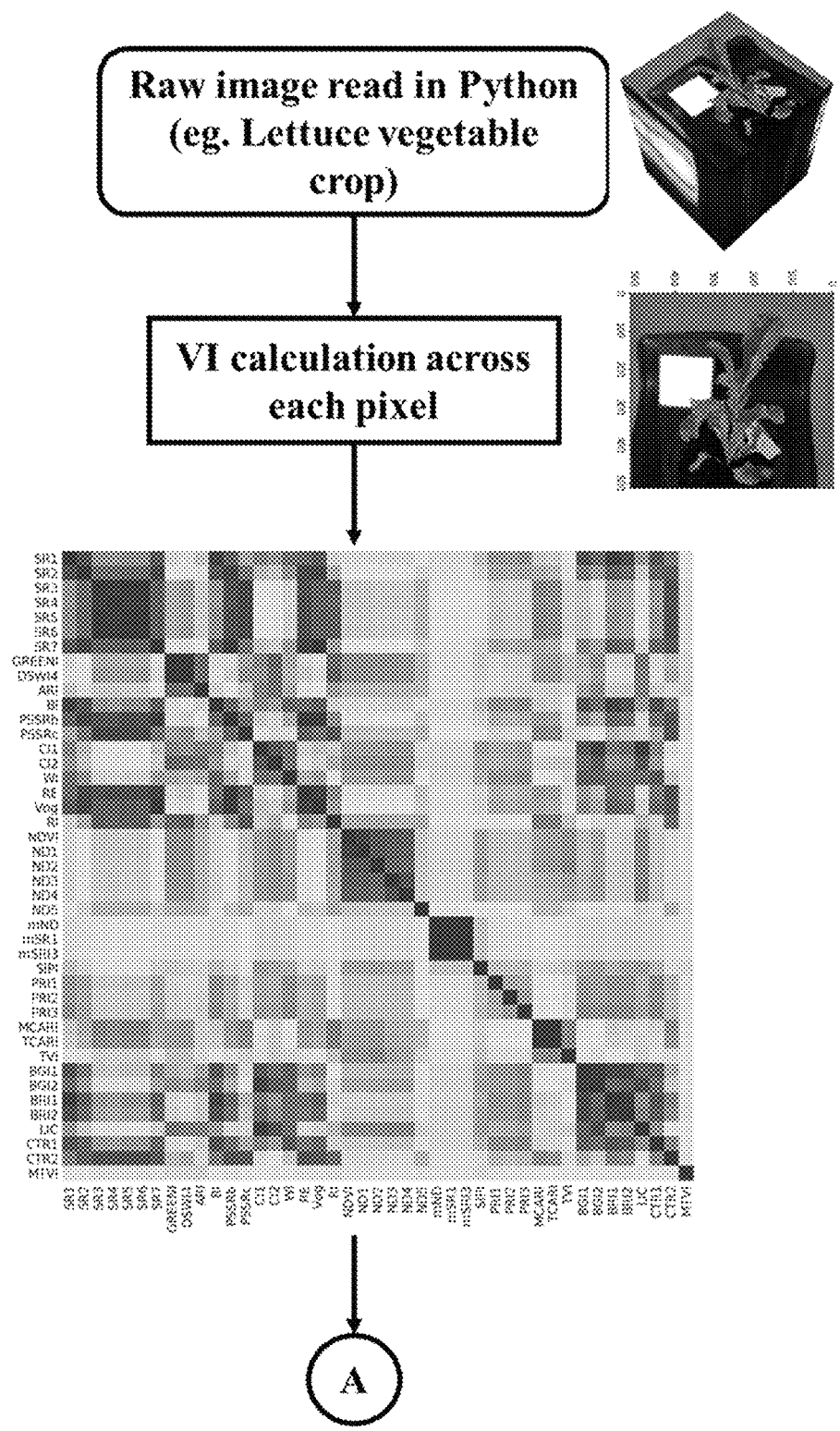
FIGS. 7A and 7B show a graphical representation flow of development of a high accuracy model (for crop health, disease detection & prediction, crop growth stages demarcation, etc.) using raw images as input.
Figure 7B:
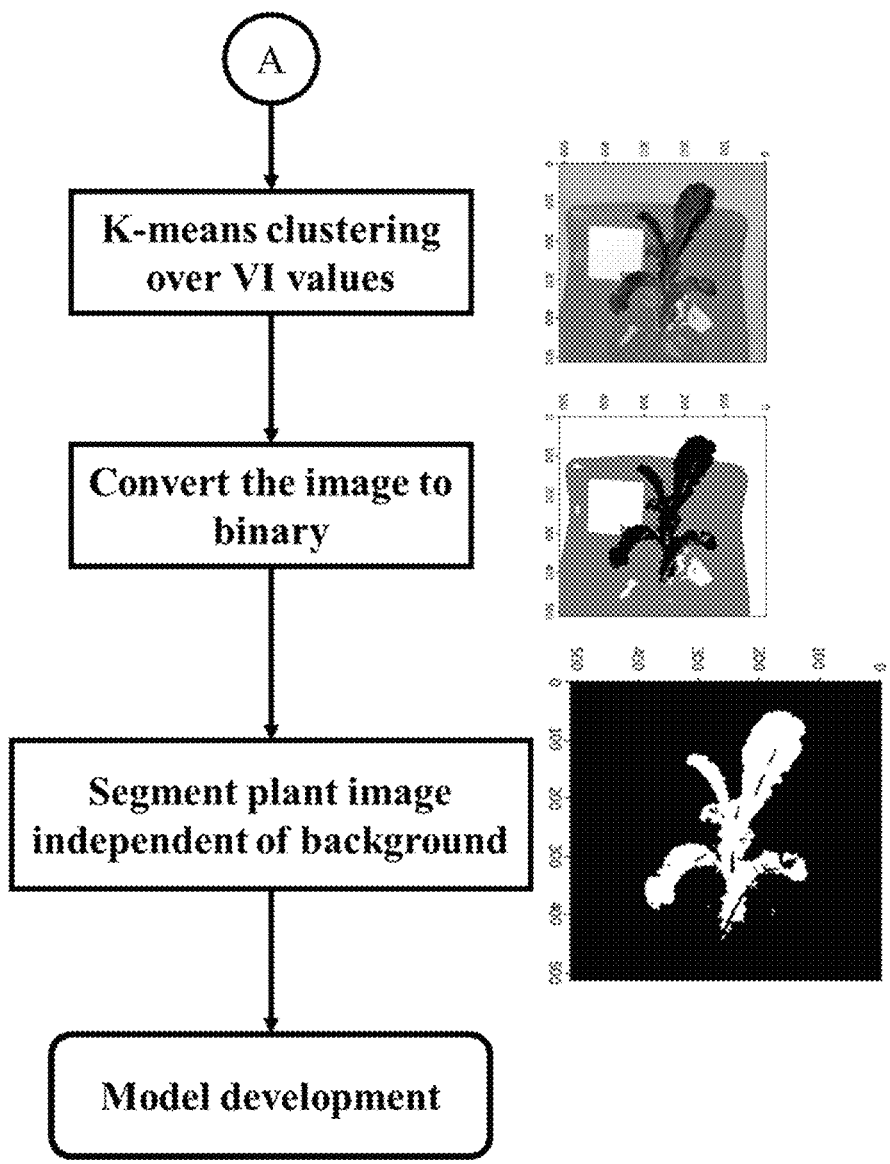

FIGS. 7A and 7B show an exemplary flow of development of a high accuracy model (for crop health, disease detection & prediction, crop growth stages demarcation, etc.) using raw images.

Figure 5:
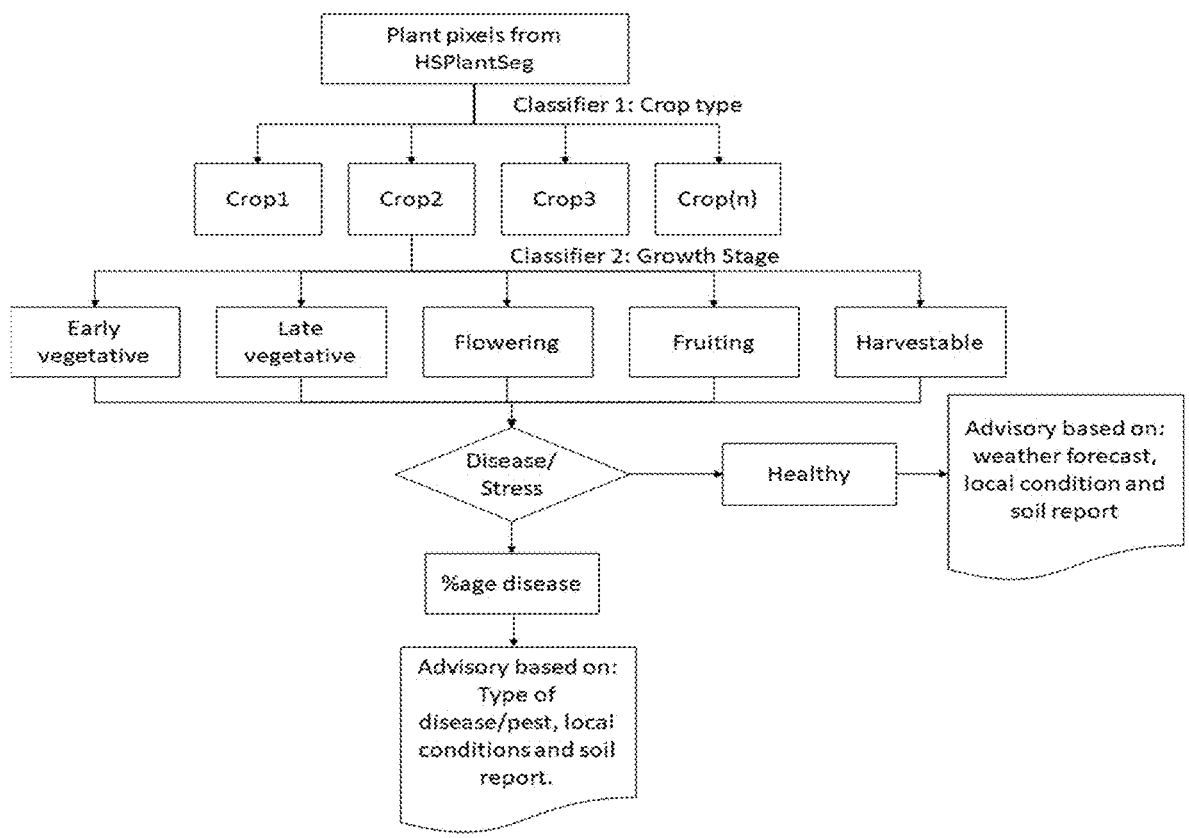
FIG. 5 illustrates a flow diagram explaining the cascade of computational steps for detection and prediction as performed by the system of FIG. 1.

For the purpose of crop type/stage or disease detection, the prediction engine 132 takes each plant pixel (from the segmented image) as a singular data point and uses a pre-trained deep learned classifier. Each pixel is a combination of at least 204 band reflectance values along with at least 30 to 300 computed vegetation indices. There are series of classifiers and which run one after the other to generate at least one meaningful advisory for precision agriculture and for quality evaluation and sorting of agricultural products. The algorithmic flowchart of the classification and detection model is shown in FIG. 5.

Advantageously, the prediction engine 132 is configured to generate a mask over plant parts which are found to be infected, and is further configured to compute a total infected area of the plant, wherein if the computed total area exceeds a predetermined limit, the prediction engine 132 generates advisory suggesting immediate measures to stop the spread of disease in plants and cure the disease.

Figure 10:
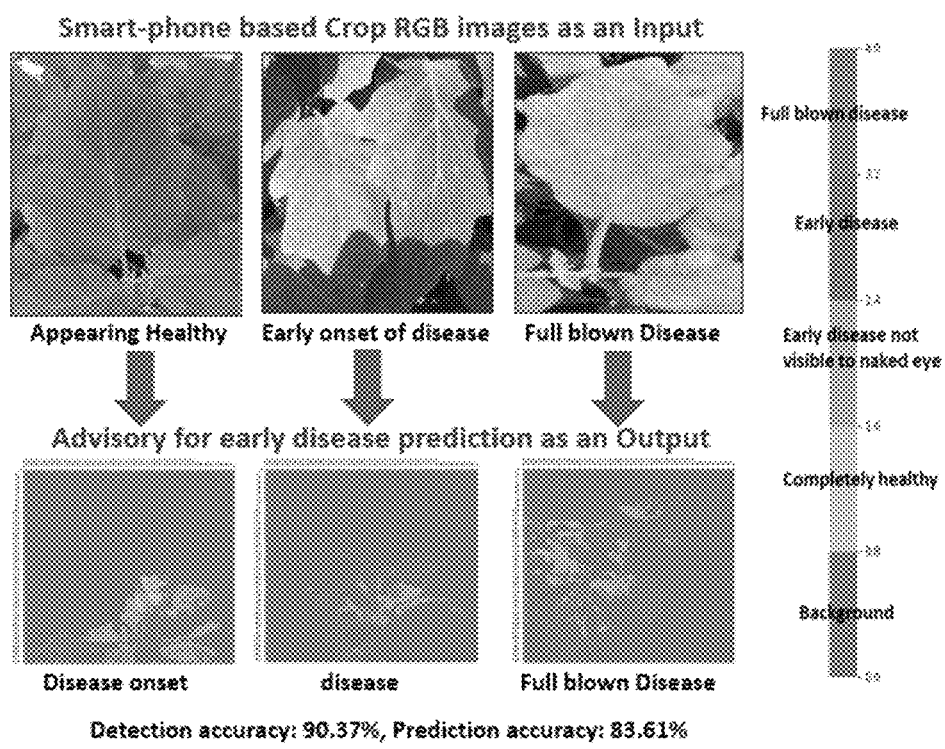
FIG. 10 illustrates an example of crop disease early prediction using the system of FIG. 1.
Figure 11A:
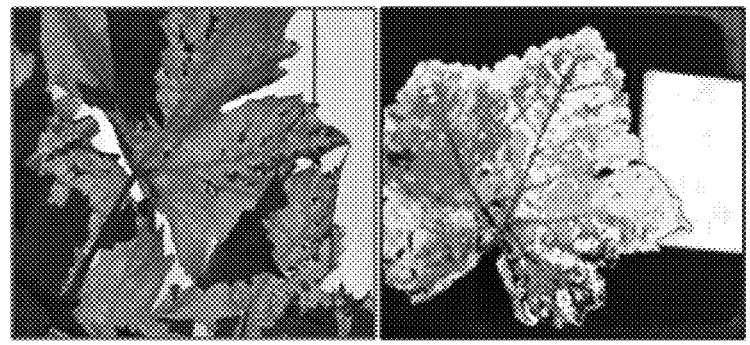
FIGS. 11A-11C illustrate an example of detection of crop disease in grapes, pomegranate, and tomato using the system of FIG. 1.
Figure 11B:
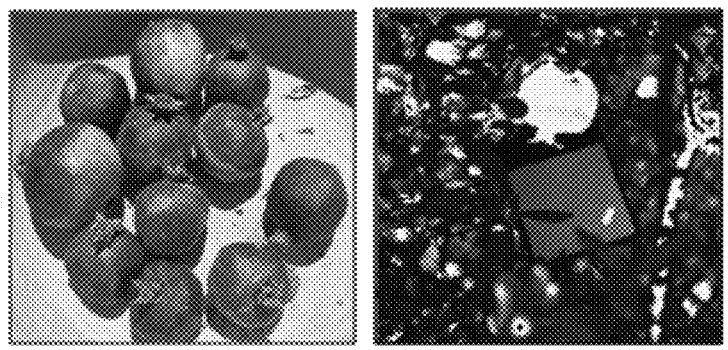
Figure 11C:
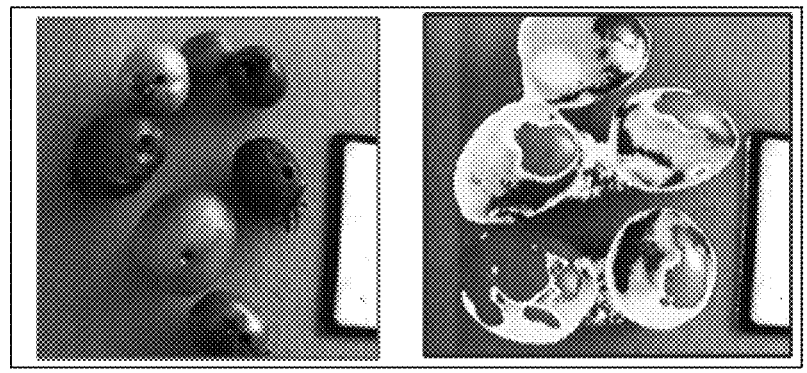
Figure 11D:
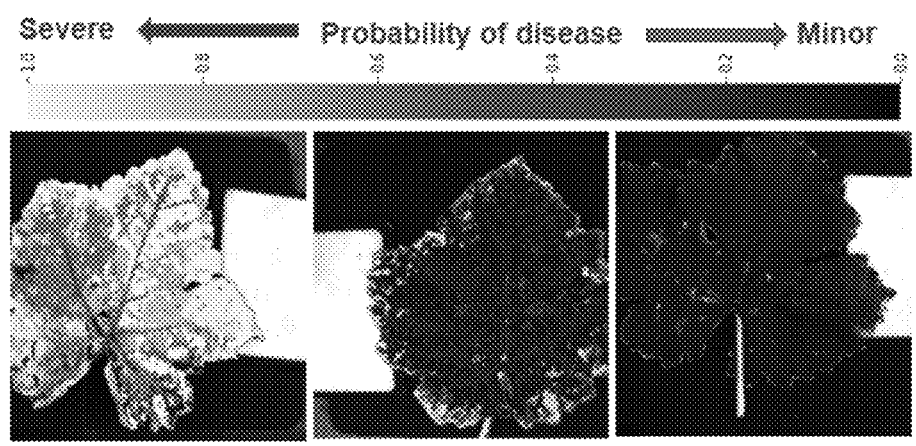
FIG. 11D illustrates an example of prediction of extent of disease progression (Downey mildew disease) in a grape leaf using the system of FIG. 1.

FIG. 10 illustrates an example of crop disease early prediction using the system 100. Similarly, FIGS. 11A-11C illustrate an example of detection of crop disease in grapes, pomegranate, and tomato using the system 100.

Figure 12:
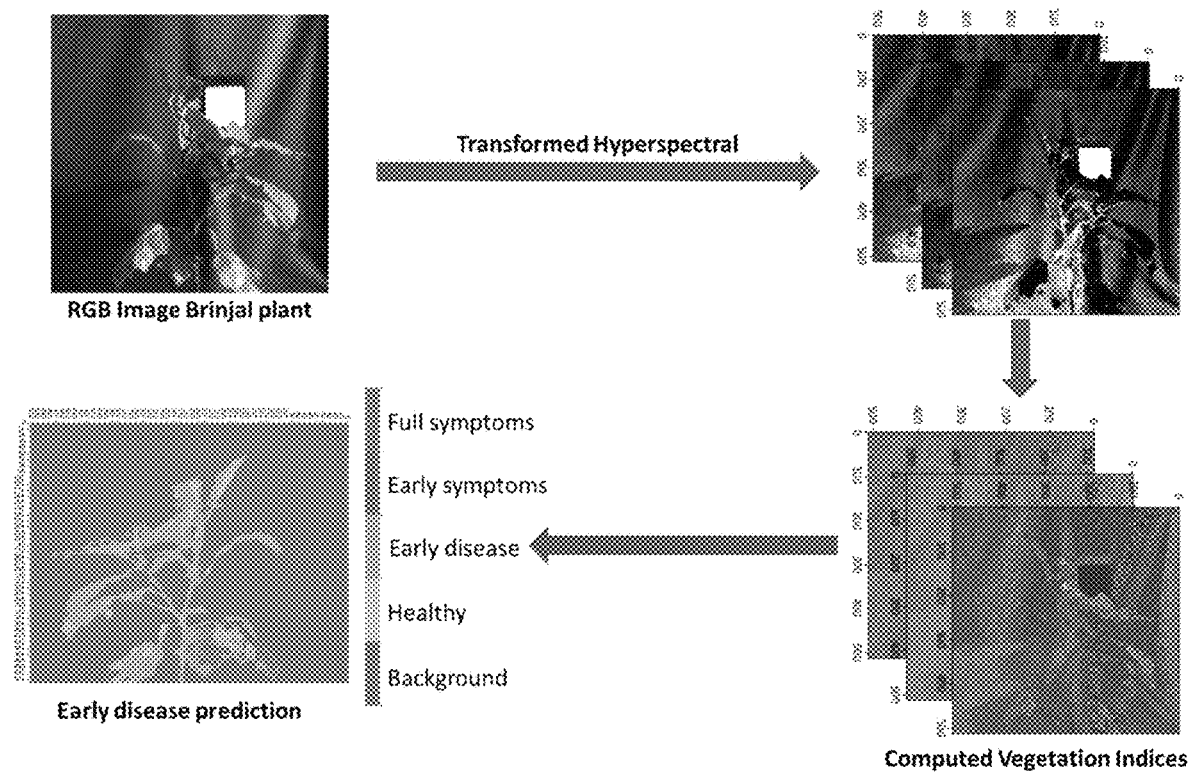
FIG. 12 illustrates an example of early disease prediction in brinjal plant using the system of FIG. 1.

FIG. 12 illustrates an example of early disease prediction for eggplant leaf spider mite disease. The figure shows areas of the plant which contain the disease (blue and purple color) along with highlighted areas which look healthy to naked eyes but have disease progressing into it and are likely to develop visible symptoms. The system 100 and method takes an RGB image as input and first transforms it into hyperspectral bands which are required to compute specific vegetation indices used in segmentation of the image. The segmented image is used with the pretrained disease prediction model to determine regions which are infested with the disease even before the actual visible symptoms appear.

Figure 13:
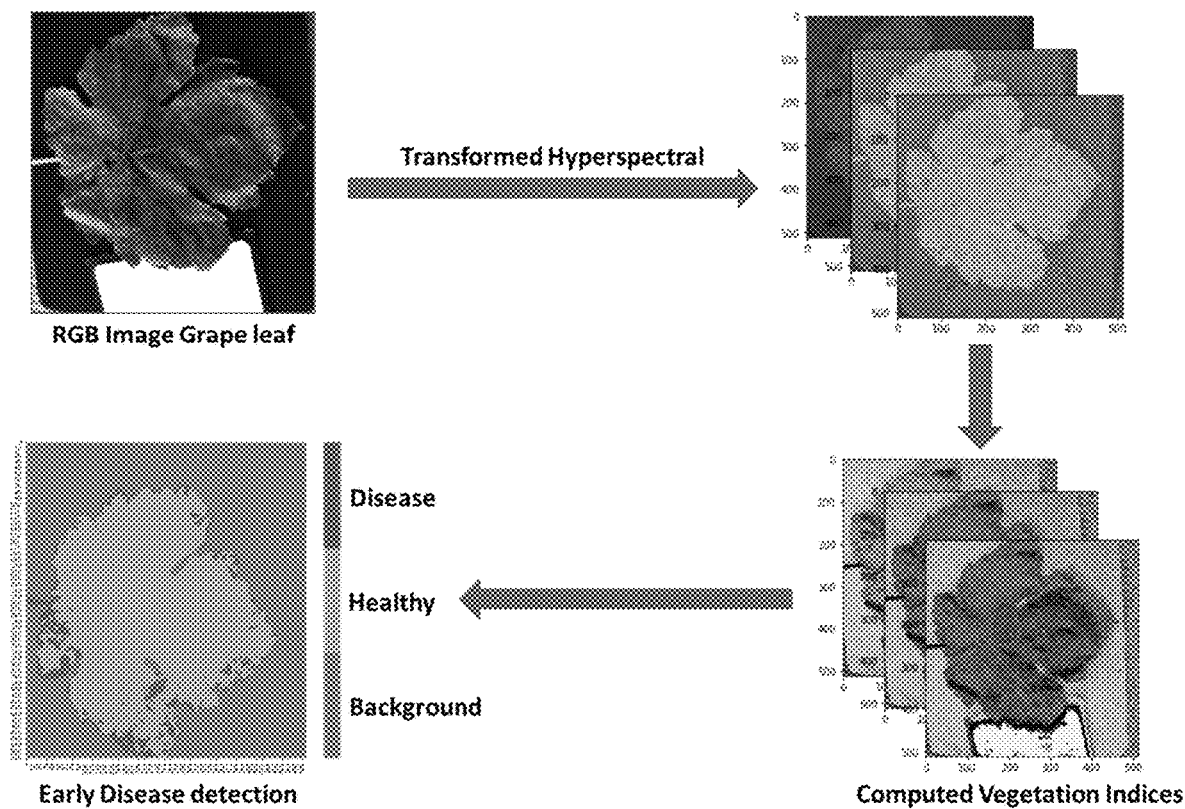
FIG. 13 illustrates an example of early detection of disease progression and extent of infection prediction in a grape leaf using the system of FIG. 1.

FIGS. 11O and 13 illustrate an example of early disease detection in plants (downy mildew in grape leaves). The system 100 and method takes an RGB image as input and first transforms it into hyperspectral bands which are required to compute specific vegetation indices used in segmentation of image along with pretrained disease detection models to determine regions which are infested with disease. In this example of RGB image of grape leaf captured through smartphone, no visible external disease symptoms are present or no marked phenotype that can be noticed through the naked eye is present. Only after using the method of image processing, one can visualize the onset of disease (blue pseudo-colour marked region), thus facilitating early disease detection. This will help farmers to take early necessary remedial measures before the disease spreads to the entire cultivation area or can apply localized chemical spray instead of the entire field of cultivation. Thus, the method and system of early disease detection help in restricting disease spread, reduce input cost, ensure minimal use of toxic chemicals and help in producing healthy food.

Figure 14:
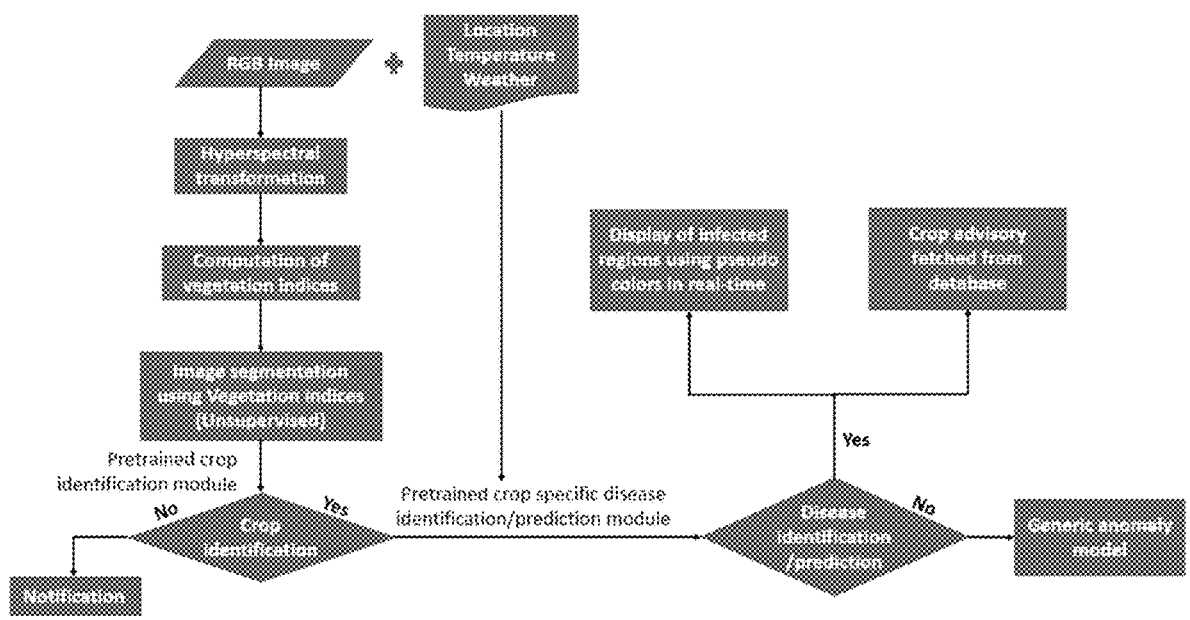
FIG. 14 illustrates a flow diagram depicting general workable steps involved in a method for providing advisory for precision agriculture.

FIG. 14 illustrates a flow diagram depicting general workable steps involved in a method for providing advisory for precision agriculture, particularly in relation to crop identification and disease prediction.

Figure 2:
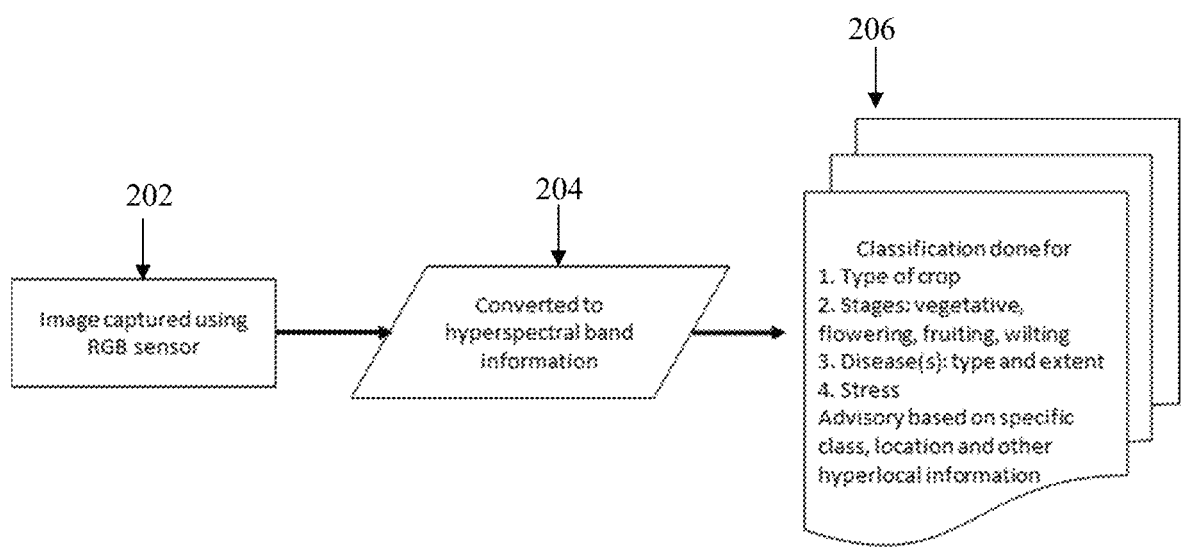
FIG. 2 illustrates a flow diagram of end to end process flow of the system for precision agriculture of FIG. 1.

The present disclosure further envisages an advisory generating method for precision agriculture and for quality evaluation and sorting of agricultural products. Referring to FIG. 2, the method broadly comprises the following steps:

At Step 202—An image is captured using Red green Blue (RGB) sensor camera.

At Step 204—The image is processed by performing computational steps and output is generated for precision agriculture advisory or for quality evaluation and sorting of agricultural products. The processing involves:
  a. RGB to Hyperspectral (HS) transformation,
  b. Computation of vegetation indices (VIs) based on Spectral signatures, and
  c. Use of computed VIs for plant extraction and denoising.

At step 206—Crop type identification, Plant part segmentation, Crop growth stages identification, Crop health prediction, Crop disease detection, Crop disease prediction are performed using one or more pre-trained prediction models.

In particular, the advisory generation method comprises the following steps:
  i. capturing, by at least one red green blue (RGB) imaging unit 106 of a user device 102, at least one digital image of a scene, the imaging unit 106 integrated with a first set of sensors 108 to ensure capturing of a clear, stable and low-noise digital image under different light conditions;
  ii. receiving, by a processing unit 110 of the user device 102, the digital image from the imaging unit 106;
  iii. receiving, by the processing unit 110, a sensed data corresponding to a pre-determined set of scene-related and environmental parameters from a second set of sensors 134;
  iv. transmitting, by a first communication module 112 of the user device 102, the digital image and the sensed data;
  v. receiving, by a second communication module 122 of a cloud server 104, the digital images and the sensed data from the user device 102 via a wireless communication network;
  vi. storing, in a database 124 of the cloud server 104, chemical signature and spectral signature based machine and deep learning library datasets comprising a prior acquired data for different crops and diseases, said data associated at least with abiotic stress symptoms, nutrient deficiency, toxicity symptoms, crop growth stages, growth stage wise nutrient requirement, information on weeds, and pre-harvest and post-harvest crop quality;
  vii. receiving, by a correlation module 126 of the cloud server 104, the datasets from the database 124 to train one or more prediction models;
  viii. constructing, by the correlation module 126, a three-dimensional HyperIntelliStack data structure from the datasets, the HyperIntelliStack data structure providing correlations between at least a set of red green blue (RGB) pixel values and hyperspectral reflectance values corresponding to each of said RGB values, each face of the HyperIntelliStack data structure representing one primary RGB reflectance, each of the faces divided into a plurality of cells, wherein each cell provides a pre-trained hyperspectral signature for a given set of RGB values;
  ix. transforming, by a transforming unit 128 of the cloud server 104, the received digital image made of multiple RGB pixel values into a hyperspectral image using the HyperIntelliStack data structure;

x. computing, by a computation module 130 of the cloud server 104, a plurality of vegetation indices for each pixel of the hyperspectral image;

xi. generating, by the computation module 130, a segmented image from the received hyperspectral image based on the computed vegetation indices;

xii. receiving, by a prediction engine 132 of the cloud server 104, the segmented image from the computation module 130;

xiii. generating, by the prediction engine 132, at least one meaningful advisory for precision agriculture and for quality evaluation and sorting of agricultural products using the segmented image and one or more prediction models; and xiv. receiving, by the user device 102, the generated advisory from the cloud server 104; and xv. displaying, by a display unit 116 of the user device 102, the received advisory to a user.

In an embodiment, the step of transforming, by the transforming unit 128 of the cloud server 104, the received digital image made of multiple RGB pixel values into the hyperspectral image using the HyperIntelliStack data structure comprises:

receiving, by a translation module, the digital image;

reading, by the translation module, the received image pixel by pixel and extracting a hyperspectral signature corresponding to each pixel using the pre-trained HyperIntelliStack data structure;

receiving, by a combining module, the extracted signatures corresponding to each pixel in the digital image from the translation module; and combining, by the combining module, each of the signatures to form the hyperspectral image.

In an embodiment, the steps of computing, by the computation module 130, the set of vegetation indices for each pixel of the hyperspectral image and generating, by the computation module 130, the segmented image from the received hyperspectral image based on the computed vegetation indices comprise:

computing, by an estimator, the vegetation indices for each pixel by superimposing the received sensed data and the hyperspectral image;

filtering, by a clustering module, the hyperspectral image by applying k-means clustering over the computed vegetation indices;

converting, by a processor, the clustered super pixels into a binary image; and generating, by the processor, the segmented image using by removing a background portion and retaining only a plant portion in the image.

The user device 102 of the system 100 can be any type of device capable of capturing RGB (RED, GREEN, BLUE) colour space digital images with an enhanced field of vision using one or more cameras, including but not limited to smart phone, tablet, wearables, any movable camera systems in indoor green-house/poly-houses, any camera attached to computer vision systems, any camera attached to any type of unmanned aerial vehicle, any camera attached to movable conveyor belt systems, any RGB-depth camera attached to a robotic device, other electronic devices and one or more combinations thereof. For example, the user device 102 may be implemented in a robot-assisted fruit and vegetable picking and harvesting operation, where robotic machines may be attached to RGB depth sensors and embedded or integrated with RGB to hyperspectral transformation model along with proximity MEMS sensor and kinaesthetic MEMS sensors.

In an exemplary embodiment, the RGB pixel values are correlated with hyperspectral reflectance values in a deep learning model. After, upscaling and complete transformation of RGB to corresponding hyperspectral signatures more than 200 crop vegetative indices are used to compute maximum variation for a given crop trait and crop type. Using a unique combination of reflectance and vegetation indices, the hyperspectral image is segmented to get rid of the background environment and different lighting conditions. The segmentation resulting is illumination independent as ratios of reflectance values are used, which eliminate the illumination constant. Using the deep learning model and artificial intelligence (AI) based transformation along with crop vegetative indices, a final actionable intelligence is generated as output and displayed on the display unit 116 of the user device 102. The actionable intelligences include, but are not limited to, crop early disease predictions, crop disease progression advisory, crop growth stages classification, crop growth stage wise nutrient requirement, crop type classifications, weed detection, crop harvest decision prediction, and crop anomaly detection including crop health predictions.

In the area of precision agriculture in both developing and developed countries, 'early prediction' has a significant application as compared to only "detection". As "early prediction" advisories make invisible crop phenotype or signatures visible, when crop disease or health phenotypes are not visible to human eyes but still a machine or combination of system and method facilitate to see the invisible, it can be termed as 'early prediction' capability. In conjunction with crop prediction based actionable intelligence, a user can get 'remedial solutions' with an inbuilt AI model and the output can be displayed in regional languages using an AI-based natural language processing algorithm for the different regional farmers of India.

The method as disclosed in the present disclosure is generic and broad. Therefore, it can be used for predictions, early detection and prediction in any crop and in any other application such as evaluating food quality, fruits and vegetable sorting, detecting toxic chemical residues in crops and plants, detecting food adulteration, and assessing the human skin health and allied areas. Further, the prior arts focus majorly on the detection of diseases rather than the prediction of diseases based on the information available. The method of the present disclosure can work even when the data is not labelled and it can perform 'early disease predictions', 'prediction of progression of diseases', 'same crop different variety detection' and other allied predictions in the agriculture process. The conventional data structures contain long columns which take more time to be traversed as compared to the indexed dictionary which is faster and takes lesser space. The dictionary data structure and HyperIntelliStack technique as used in the present disclosure can process big library of input images and with high recall efficiency, thereby significantly reducing computational space, power and other allied features. Further, most of the prior art models are specific for a crop or an application and cannot be used for different crops and different agricultural applications. Therefore, they may require more than 100 apps/APIs to be embedded in smartphones to cover different crops, varieties or applications. Hence, the method of the present disclosure is very global, low cost, and scalable in any generation of smartphone.

Advantageously, the various modules of the system 100 may be implemented using one or more processor(s). The processor may be a general-purpose processor, a Field Programmable Gate Array (FPGA), an Application Specific Integrated Circuit (ASIC), a Digital Signal Processor (DSP), a microprocessor, a microcontroller, or a state machine. The processor may also be implemented as a combination of computing devices, e.g., a combination of a DSP and a microprocessor, a plurality of microprocessors, one or more microprocessors in conjunction with a DSP core, or any other such configuration. The processor may be configured to retrieve data from and/or write data to the memory. The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. The memory may include a set of instructions or a control logic which the processor implements to perform the functionalities of modules of user device 102 and the cloud server 104.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of an image processing based advisory system and a method thereof, that:
  are computationally inexpensive;
  do not require bulky and sophisticated computation facility and are therefore scalable and low cost;
  do not require bulky and sophisticated computation infrastructure, or costly sensor ecosystem or costly detector or costly camera module, and therefore can be used in mass scale and low-cost industrial utility;
  overcome the hardware limitations of hyperspectral or multispectral like or other allied devices such as bulky camera and hardware modules, temperature reducing heat sinks, costly optical sensors and detector systems and other allied costly hardware parts;
  facilitate early prediction of diseases, determine the progression of diseases in crops/plants, determine crop health, early prediction of nutrient deficiencies and generate meaningful advisories for farmers;
  facilitate illumination independent processing of images, and can therefore be used in indoor, outdoor, industrial, or any other environmental conditions;
  can perform crop classification and can therefore be used in mixed cropping scenarios or mixed farming systems;
  can upscale and transform "pixel by pixel data" of input images with high pixel recall efficiency from red green blue (RGB) form to hyperspectral form;
  can detect and predict health and diseases for every segment of a plant viz. leaf, fruit, and flower;
  that is global in nature and method, system is applied for different crop types;
  that can generate actionable intelligence for farmers with ease;
  facilitate complete recovery of hyperspectral data in the range of 400 to 2500 nm from RGB images;
  determine seed quality and assist farmers in taking harvesting decisions;
  support local or geography-specific languages, and thereby provide ease of handling to the farmers or common man; and
  implement a sensor-independent process for providing hyperspectral level information from RGB images.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of devices, articles, or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation

The invention claimed is:

1. An image-processing based advisory system (100) for precision agriculture and for quality evaluation and sorting of agricultural products, said system (100) comprising:
  a. a user device (102) comprising:
    i. at least one red green blue (RGB) imaging unit (106) for capturing at least one digital image of a scene, said imaging unit (106) integrated with a first set of sensors (108) to ensure capturing of a digital image under different light conditions;
    ii. a processing unit (110) configured to cooperate with said imaging unit (106) to receive said digital image, and further configured to cooperate with a second set of sensors (134) to receive a sensed data corresponding to a pre-determined set of scene-related and environmental parameters;
iii. a first communication module (112) configured to cooperate with said processing unit (110) to receive and transmit said digital image and said sensed data;
iv. a battery (114) for supplying power to at least said imaging unit (106), said first set of sensors (108), said processing unit (110), and said first communication module (112),
b. a cloud server (104) comprising:
i. a second communication module (122) configured to receive said digital image and said sensed data from said user device (102) via a wireless communication network;
ii. a database (124) configured to store a) chemical signature based machine learning and deep learning library dataset and b)spectral signature based machine learning and deep learning library datasets comprising a prior acquired data for different crops and diseases, said data associated at least with abiotic stress symptoms, nutrient deficiency, toxicity symptoms, crop growth stages, growth-stage wise nutrient requirement, information on weeds, and pre-harvest and post-harvest crop quality;
iii. a correlation module (126) configured to cooperate with said database (124) to receive said datasets to train one or more prediction models, said correlation module (126) further configured to construct a three-dimensional HyperintelliStack data structure from said datasets, said HyperintelliStack data structure providing correlations between at least a set of red green blue (RGB) pixel values and hyperspectral reflectance values corresponding to each of said RGB values, each face of said HyperintelliStack data structure representing one primary RGB reflectance and/or value, each of said faces divided into a plurality of cells, wherein each cell provides a pretrained hyperspectral signature for a given set of RGB values;
iv. a transforming unit (128) configured to cooperate with said correlation module (126) to transform said received digital image made of multiple RGB pixel values into a hyperspectral image using said HyperintelliStack data structure;
v. a computation module (130) configured to cooperate with said transforming unit (128) to compute a plurality of vegetation indices for each pixel of said hyperspectral image, and further configured to generate a segmented image from said received hyperspectral image based on said computed vegetation indices; and
vi. a prediction engine (132) configured to cooperate with said computation module (130) to receive said segmented image, and further configured to cooperate with said correlation module (126) to generate at least one advisory for precision agriculture and for quality evaluation and sorting of agricultural products using said segmented image and said one or more prediction models.

2. The system (100) as claimed in claim 1, wherein said user device (102) comprises a display unit (116) configured to receive said meaningful advisory from said cloud server (104) and display said received advisory to a user of the device (102).

3. The system (100) as claimed in claim 1, wherein said meaningful advisory comprises at least one intelligence corresponding to crop type differentiation, plant part segmentation, crop growth stages identification, crop biotic and abiotic stress detection, crop health prediction, crop diseases prediction, crop harvesting decision, crop quality determination, fruit ripening determination, weed detection in agriculture field, contamination detection in crop and soil, and precision nutrition recommendation.

4. The system (100) as claimed in claim 1, wherein said scene comprises views of one or more vegetables, fruits, plants, crops, any other vegetation, or a combination thereof from an agricultural field, an outdoor agricultural cultivation system, an indoor agricultural cultivation system, or a retail outlet.

5. The system (100) as claimed in claim 1, wherein said first and second set of sensors (108, 134) are miniatured sensors or micro-electromechanical system (MEMS) sensors.

6. The system (100) as claimed in claim 1, wherein said first set of sensors (108) comprise at least one of the following sensors:
a. an autofocus and light sensor for facilitating capturing of the digital image through said imaging device (106) under different light conditions;
b. an inertial measurement unit (IMU) sensor with gyroscope and drive units for facilitating capturing of a clear and stable digital image;
c. an autofocus sensor and a complementary metal oxide semi-conductor (CMOS) sensor for capturing of low noise, high speed digital image with high colour reproducibility, machine vision application capability and sensitivity towards near-infrared region; and
d. a red green blue (RGB) depth-based sensor for plant height, flowering and fruiting assessment and volumetric parameter calculations including digital biomass determination.

7. The system (100) as claimed in claim 1, wherein said second set of sensors (134) are selected from the group consisting of an ambient temperature sensor, an ambient relative humidity sensor, an electrical conductivity sensor, a pH sensor, a photosynthetically active radiation sensor, a nitrogen sensor, a phosphorous sensor, a vapour pressure deficit sensor, and a SAP flow sensor.

8. The system (100) as claimed in claim 1, wherein said first and second communication modules (112, 122) are selected from the group consisting of narrowband IoT (NB-IoT) modules, radio frequency transceiver modules, Wireless Fidelity (Wi-Fi) modules, long range wireless communication modules, and cellular IoT modules.

9. The system (100) as claimed in claim 1, wherein said second set of sensors (134) are embedded within the user device (102).

10. The system (100) as claimed in claim 1, wherein said second set of sensors (134) are implemented as distributed slave nodes and installed across the scene.

11. The system (100) as claimed in claim 1, wherein said hyperspectral structures stored in said HyperintelliStack data structure comprise at least 204 hyperspectral bands which are required to compute specific vegetation indices used in segmentation of the image along with pretrained disease detection models to determine regions which are infested with disease.

12. The system (100) as claimed in claim 1, wherein said transfoiming unit (128) comprises:
a. a translation module configured to receive said digital image, and further configured to read said received image pixel by pixel to determine clustered super pixels and extract a hyperspectral signature corresponding to each pixel; and b. a combining module configured to cooperate with said translation module to receive extracted signatures corresponding to each pixel in said digital image and combine each of said signatures to form said hyperspectral image.

13. The system (100) as claimed in claim 1, wherein said correlation module (126), said transforming unit (128), said computation module (130), and said prediction engine (132) are located in the user device (102) to facilitate offline transformation and generation of digital images into hyperspectral images.

14. The system (100) as claimed in claim 1, wherein said computation module (130) cooperates with said translation module and said computation module (130) comprises:
   a. an estimator configured to compute said vegetation indices for each pixel by superimposing said received sensed data onto said hyperspectral image;
   b. a clustering module configured to apply k-means clustering over said computed vegetation indices for filtering said image; and
   c. a processor configured to cooperate with said clustering module to convert the clustered super pixels into a binary image, and further configured to generate the segmented image by removing a background portion and retaining only a plant portion in the image.

15. The system (100) as claimed in claim 1, said prediction engine (132) is configured to generate a mask over plant parts which are found to be infected, and is further configured to compute a total infected area of the plant, wherein if said computed total area exceeds a predetermined limit, said prediction engine (132) generates advisory suggesting immediate measures to stop the spread of disease in plants and cure the disease.

16. The system (100) as claimed in claim 1, wherein said user device (102) comprises:
   a. a high sensitivity global positioning system (GPS) (118) for capturing current location of the device (102) with local latitude and longitude;
   b. a user interface integrated with software development kit (118) to call one or more Application Programming Interfaces (APIs) for accessing data from pre-defined databases, raw sensor data, and current and historical weather data; and
   c. a memory (120) configured to store at least one of said accessed data, said generated advisory, said digital image, and said sensed data.

17. An image processing based advisory generating method for precision agriculture and for quality evaluation and sorting of agricultural products, said method comprising:
   a. capturing, by at least one red green blue (RGB) imaging unit (106) of a user device (102), at least one digital image of a scene, said imaging unit (106) integrated with a first set of sensors (108) to ensure capturing of digital image under different light conditions;
   b. receiving, by a processing unit (110) of said user device (102), said digital image from said imaging unit (106);
   c. receiving, by said processing unit (110), a sensed data corresponding to a pre-determined set of scene-related and environmental parameters from a second set of sensors (134);
   d. transmitting, by a first communication module (112) of said user device (102), said digital image and said sensed data;
   e. receiving, by a second communication module (122) of a cloud server (104), said digital image and said sensed data from said user device (102) via a wireless communication network;
   f. storing, in a database (124) of said cloud server (104), a) chemical signature based machine learning and deep learning library dataset and spectral signature based machine learning and deep learning library datasets comprising a prior acquired data for different crops and diseases, said data associated at least with abiotic stress symptoms, nutrient deficiency, toxicity symptoms, crop growth stages, growth stage wise nutrient requirement, information on weeds, and pre-harvest and post- harvest crop quality;
   g. receiving, by a correlation module (126) of said cloud server (104), said datasets from said database (124) to train one or more prediction models;
   h. constructing, by said correlation module (126), a three-dimensional HyperintelliStack data structure from said datasets, said HyperintelliStack data structure providing correlations between at least a set of red green blue (RGB) pixel values and hyperspectral reflectance values corresponding to each of said RGB values, each face of said HyperintelliStack data structure representing one primary RGB reflectance, each of said faces divided into a plurality of cells, wherein each cell provides a pre-trained hyperspectral signature for a given set of RGB values;
   i. transforming, by a transforming unit (128) of said cloud server (104), said received digital image made of multiple RGB pixel values into a hyperspectral image using said HyperintelliStack data structure;
   j. computing, by a computation module (130) of said cloud server (104), a plurality of vegetation indices for each pixel of said hyperspectral image;
   k. generating, by said computation module (130), a segmented image from said received hyperspectral image based on said computed vegetation indices;
   l. receiving, by a prediction engine (132) of said cloud server (104), said segmented image from said computation module (130); m. generating, by said prediction engine (132), at least one advisory for precision agriculture and for quality evaluation and sorting of agricultural products using said segmented image and said one or more prediction models; n. receiving, by said user device (102), said generated advisory from said cloud server (104); and o. displaying, by a display unit (116) of said user device (102), said received advisory to a user.

18. The method as claimed in claim 17, wherein said step of transforming, by the transforming unit (128) of said cloud server (104), said received digital image made of multiple RGB pixel values into the hyperspectral image using said HyperintelliStack data structure comprises:
   a. receiving, by a translation module, said digital image;
   b. reading, by said translation module, said received image pixel by pixel and extracting a hyperspectral signature corresponding to each pixel using said pre-trained HyperintelliStack data structure;
   c. receiving, by a combining module, said extracted signatures corresponding to each pixel in said digital image from said translation module; and
   d. combining, by said combining module, each of said signatures to form said hyperspectral image.

19. The method as claimed in claim 17, wherein said steps of computing, by said computation module (130), the set of vegetation indices for each pixel of said hyperspectral image and generating, by said computation module (130), the segmented image from said received hyperspectral image based on said computed vegetation indices comprise:

a. computing, by an estimator, said vegetation indices for each pixel by superimposing said received sensed data and said hyperspectral image;

b. filtering, by a clustering module, said hyperspectral image by applying k-means clustering over said computed vegetation indices;

c. converting, by a processor, the clustered super pixels into a binary image; and d. generating, by said processor, the segmented image by removing a background portion and retaining only a plant portion in the image.

\* \* \* \* \*